(12) United States Patent
Fujimura et al.

(10) Patent No.: US 9,183,879 B2
(45) Date of Patent: Nov. 10, 2015

(54) SUSPENSION BOARD WITH CIRCUIT

(71) Applicant: NITTO DENKO CORPORATION, Osaka (JP)

(72) Inventors: Yoshito Fujimura, Osaka (JP); Tetsuya Ohsawa, Osaka (JP); Jun Ishii, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 13/771,636

(22) Filed: Feb. 20, 2013

(65) Prior Publication Data

US 2013/0215726 A1 Aug. 22, 2013

Related U.S. Application Data

(60) Provisional application No. 61/634,752, filed on Mar. 6, 2012.

(30) Foreign Application Priority Data

Feb. 20, 2012 (JP) ................................. 2012-033893
Dec. 17, 2012 (JP) ................................. 2012-275135

(51) Int. Cl.
*G11B 21/16* (2006.01)
*G11B 5/48* (2006.01)

(52) U.S. Cl.
CPC .............. *G11B 21/16* (2013.01); *G11B 5/4826* (2013.01); *G11B 5/4833* (2013.01); *G11B 5/4853* (2013.01)

(58) Field of Classification Search
CPC ........... G11B 2005/0021; G11B 5/314; G11B 5/6088; G11B 2005/001; G11B 5/105; G11B 21/16; G11B 5/4826; G11B 5/4853; G11B 5/4833; G11B 5/486; G11B 5/4866; G11B 5/488; H01S 5/005; H01S 5/02268; H01S 5/02272; H01S 5/4031; Y10T 29/49002
USPC ..................... 360/234.4–234.7, 245.3–245.9; 369/13.24, 13.14, 13.32–13.34, 40.01, 369/44.17–44.19, 121, 124.01, 135, 369/244.1–250

See application file for complete search history.

(56) References Cited

U.S. PATENT DOCUMENTS

| | | | |
|---|---|---|---|
| 6,021,021 A * | 2/2000 | Alt et al. ..................... | 360/245.7 |
| 8,406,091 B2 * | 3/2013 | Shimazawa et al. ........ | 369/13.33 |
| 2007/0242921 A1 | 10/2007 | Matsumoto | |
| 2008/0130155 A1 | 6/2008 | Naniwa et al. | |
| 2009/0266789 A1 | 10/2009 | Shimazawa et al. | |
| 2010/0097724 A1 * | 4/2010 | Shimazawa et al. ....... | 360/245.4 |

(Continued)

FOREIGN PATENT DOCUMENTS

| | | |
|---|---|---|
| JP | 2007-052918 A | 3/2007 |
| JP | 2007-207349 A | 8/2007 |

(Continued)

*Primary Examiner* — Dionne Pendleton
(74) *Attorney, Agent, or Firm* — Jean C. Edwards, Esq.; Edwards Neils PLLC

(57) ABSTRACT

A suspension board with circuit for mounting a slider unit including an electron device, the electron device being mounted so as to form, when projected in the thickness direction with respect to the slider provided with a magnetic head, an overlapping portion that overlaps with the slider, and a protruding portion that protrudes from the slider. The suspension board with circuit is formed with a first opening penetrating in the thickness direction and accommodates the overlapping portion, and a second opening that communicates with the first opening and accommodates the protruding portion.

6 Claims, 29 Drawing Sheets

(56) References Cited

U.S. PATENT DOCUMENTS

2010/0110590 A1  5/2010  Ohsawa et al.
2011/0128827 A1* 6/2011  Shimazawa et al. ........ 369/13.02
2012/0182844 A1* 7/2012  Schreck et al. ...... G11B 5/5582
                                                369/13.33

FOREIGN PATENT DOCUMENTS

| JP | 2007-280572 A | 10/2007 |
| JP | 2008-130106 A | 6/2008 |
| JP | 2009-266365 A | 11/2009 |
| JP | 2010-108576 A | 5/2010 |

* cited by examiner

FIG.10
FIG.10(a)
FIG.10(b)
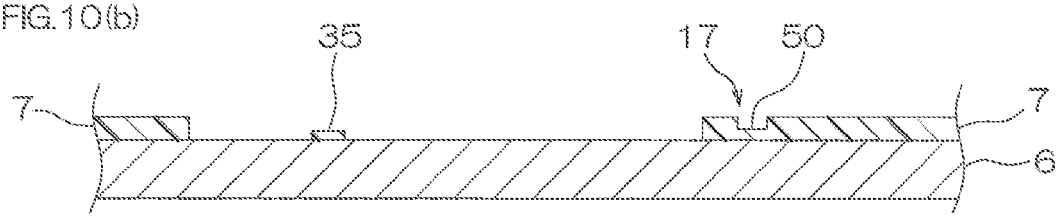
FIG.10(c)
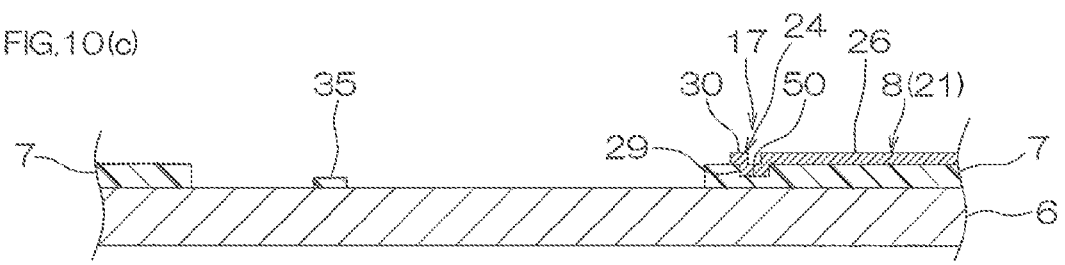
FIG.10(d)
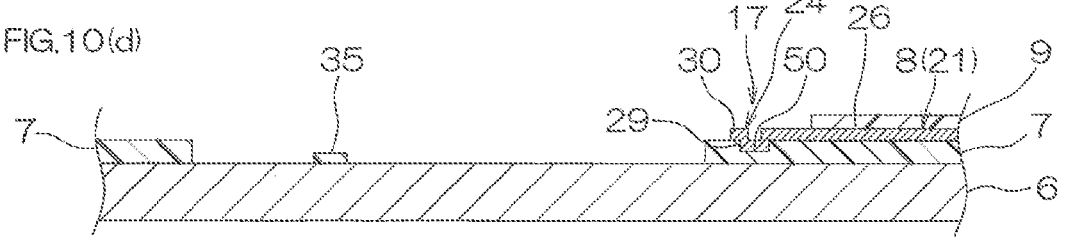
FIG.10(e)
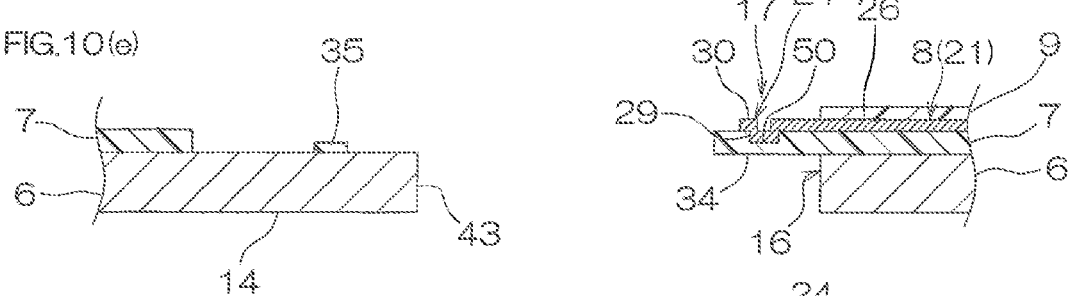
FIG.10(f)
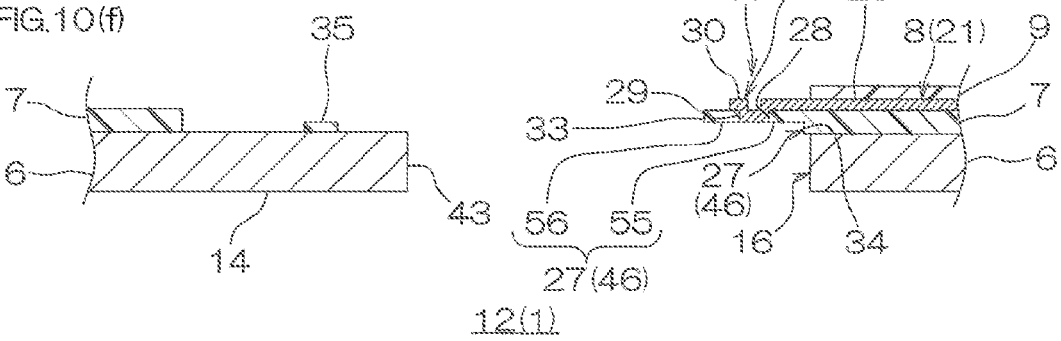

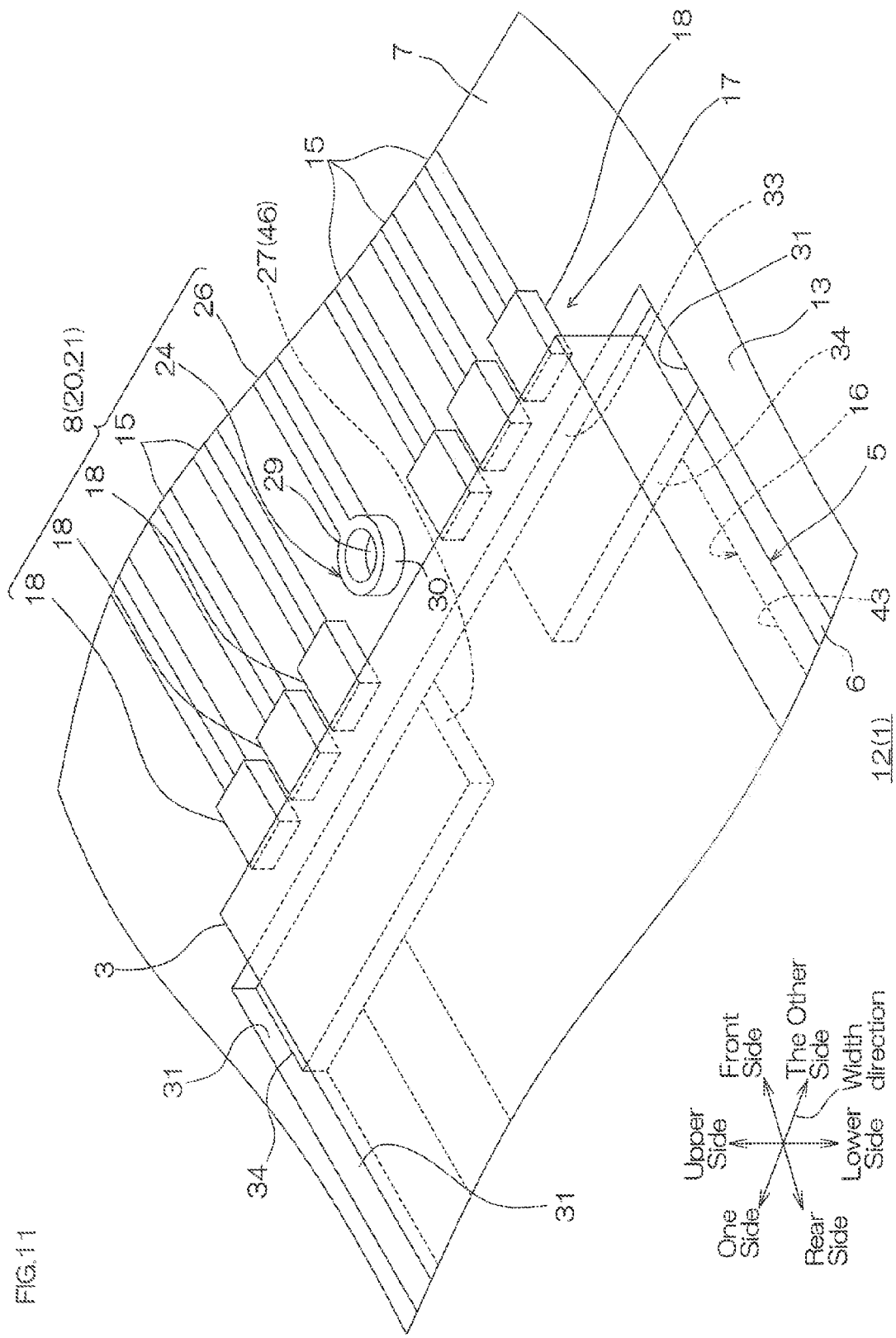

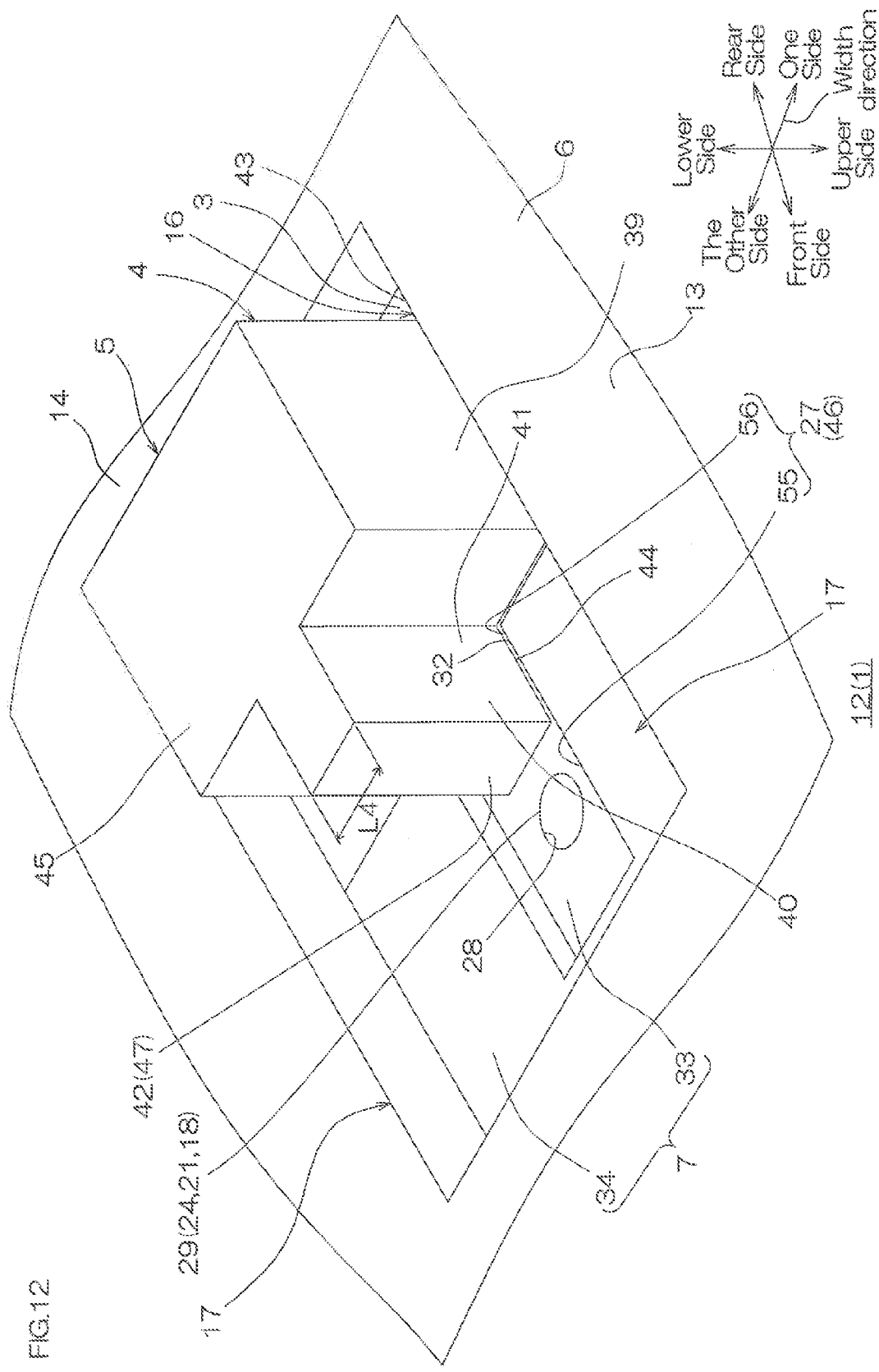

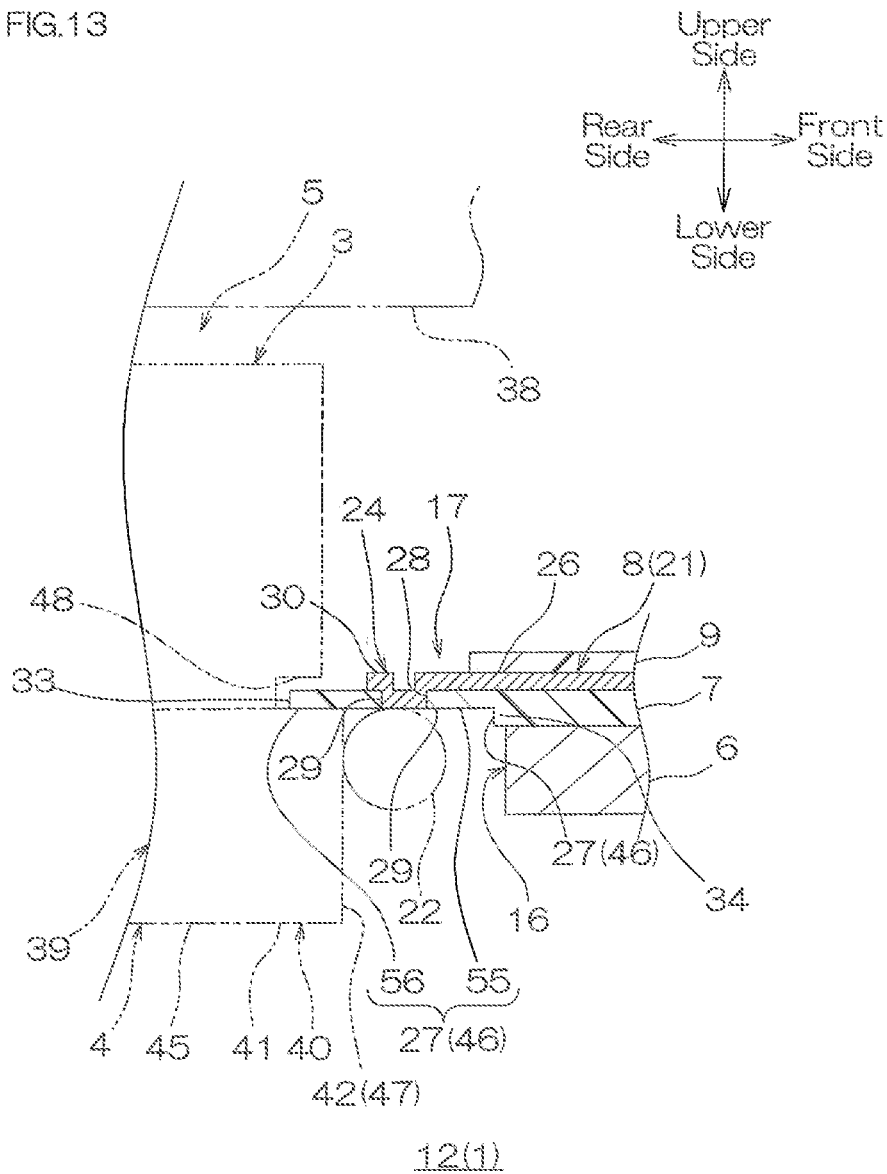

FIG.17
FIG.17(a)
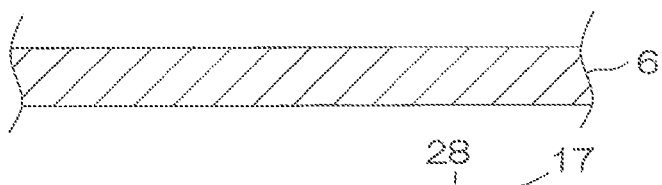
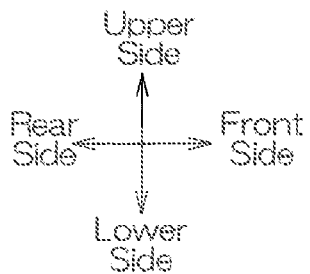
FIG.17(b)
FIG.17(c)
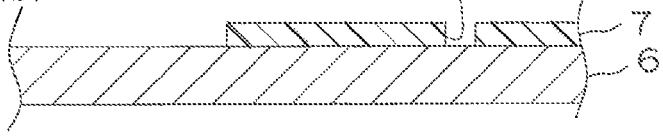
FIG.17(d)
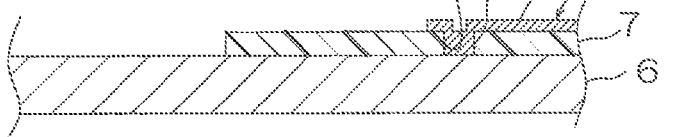
FIG.17(e)
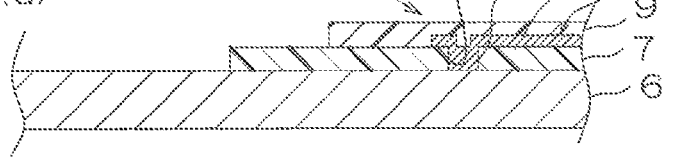
FIG.17(f)
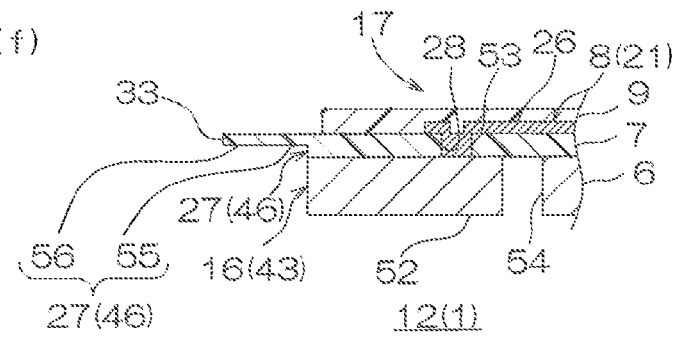

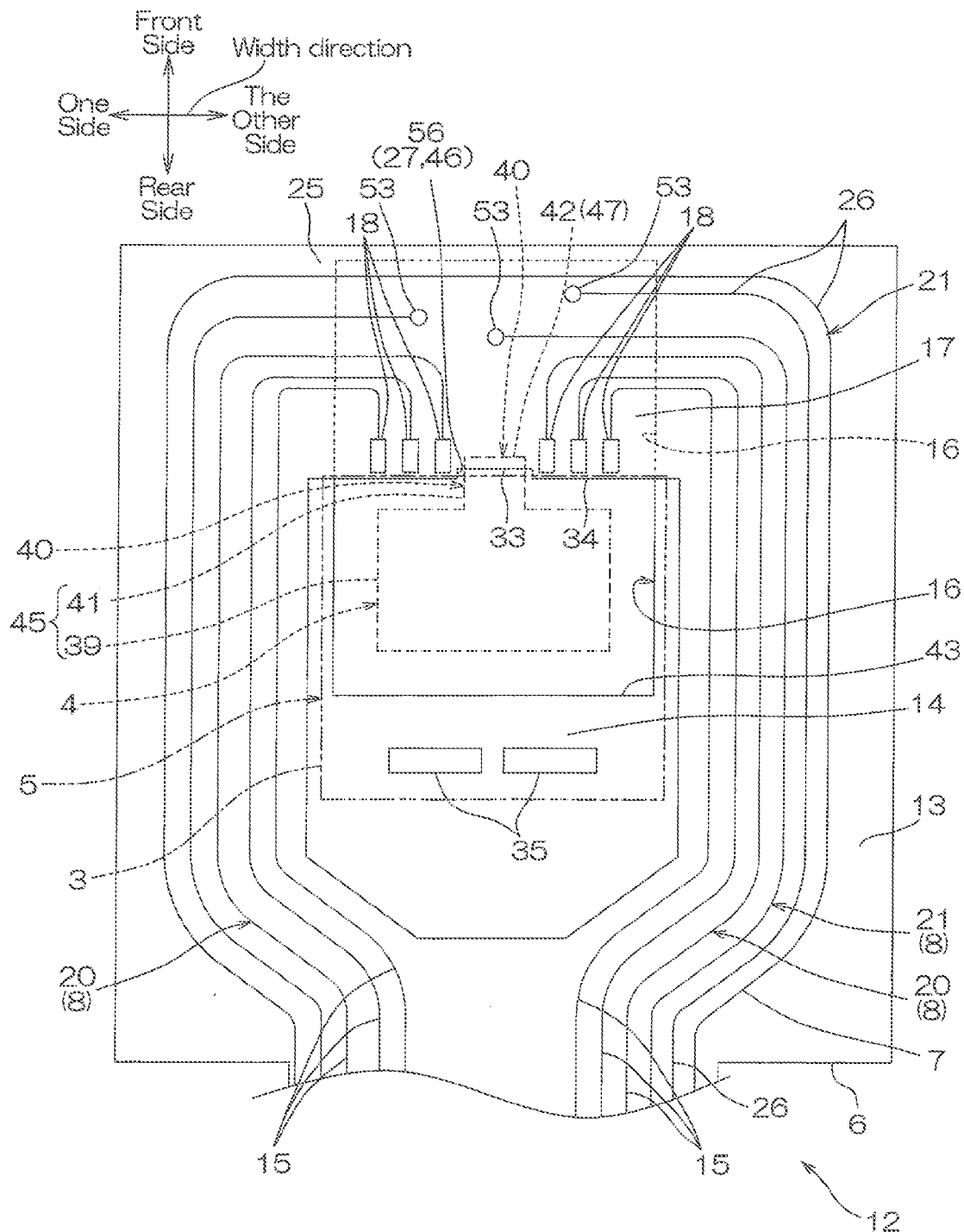

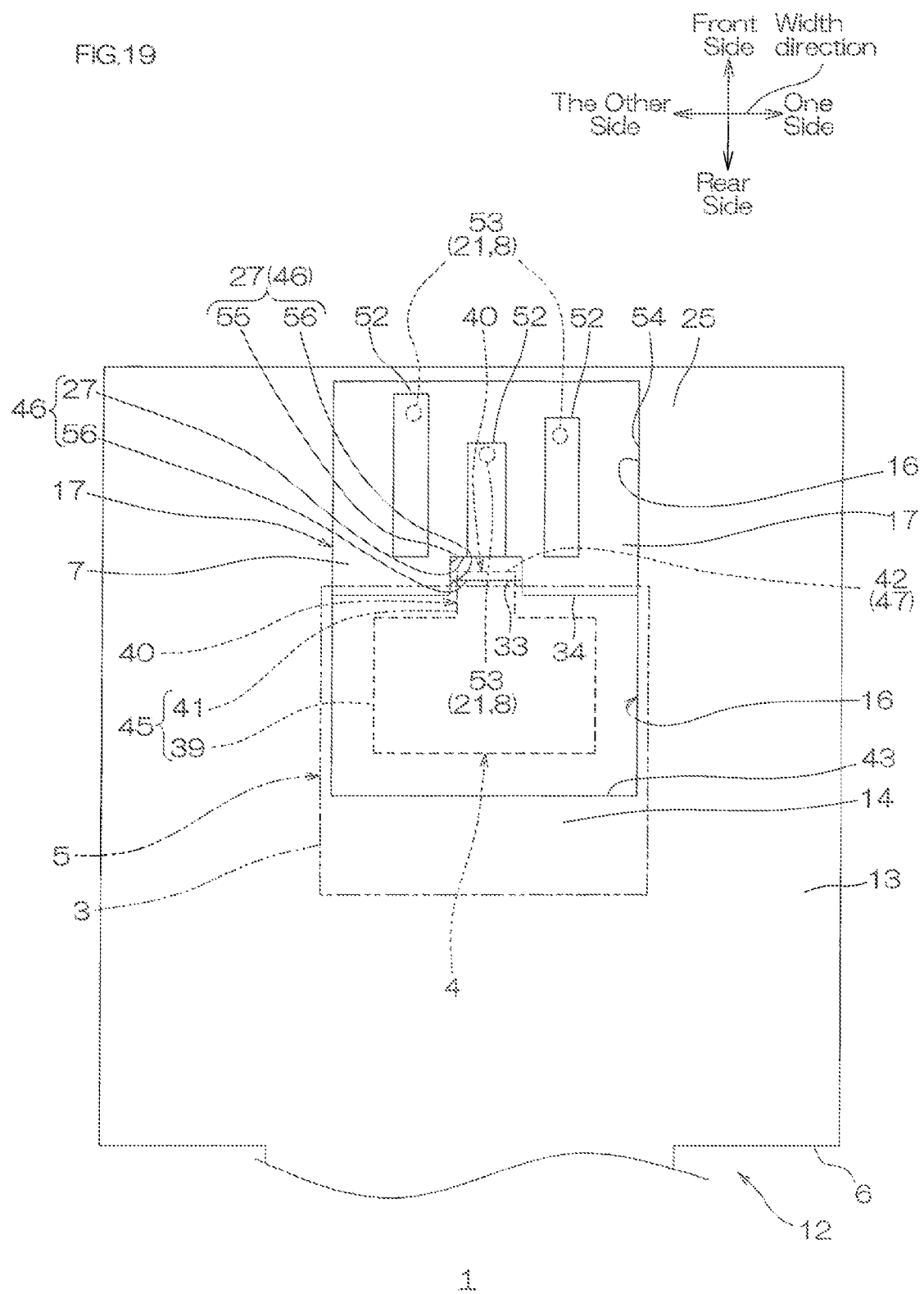

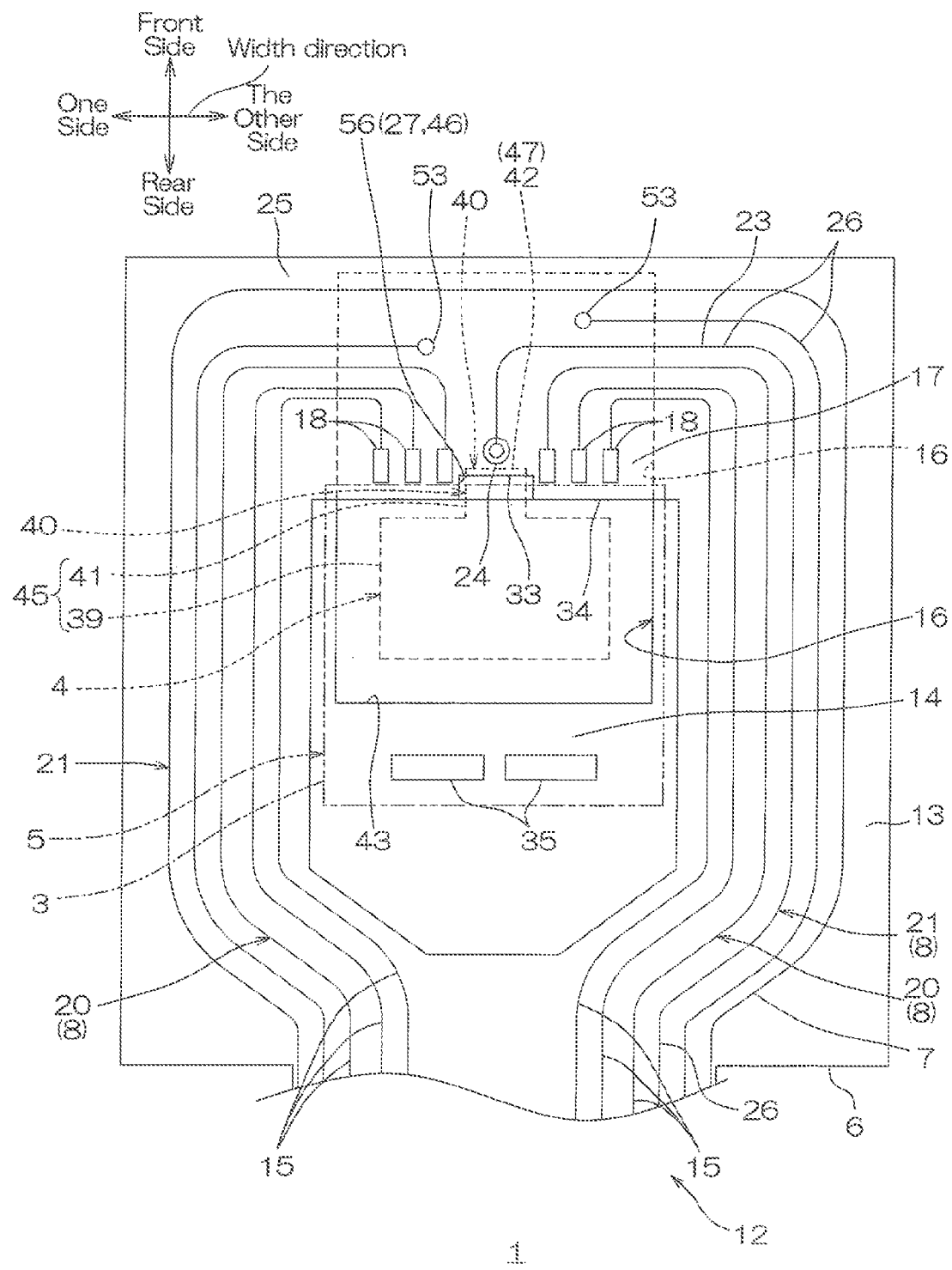

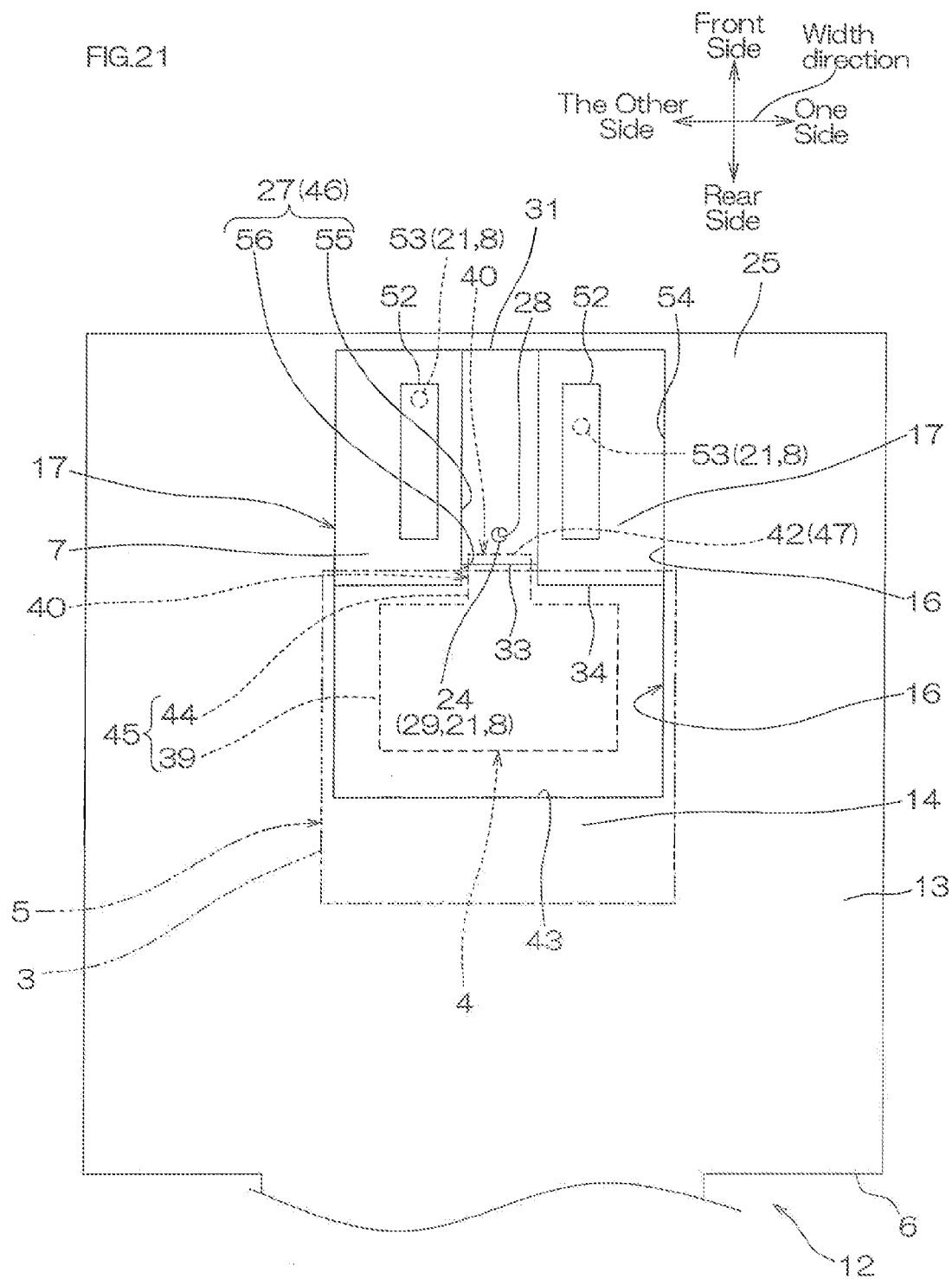

FIG.25
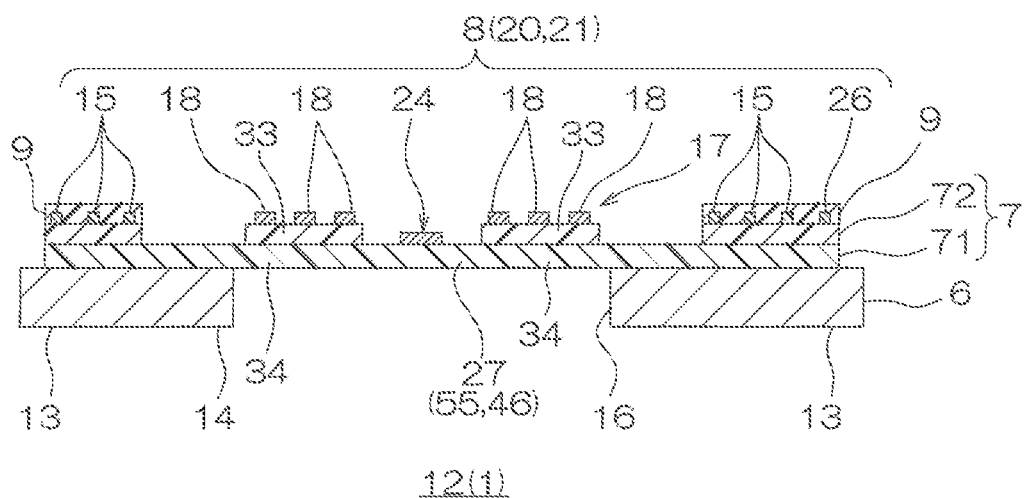
FIG.26
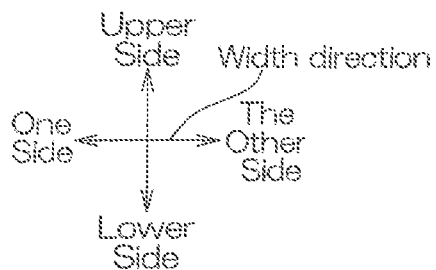
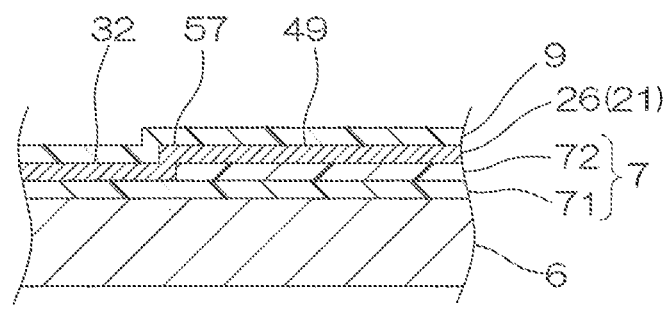

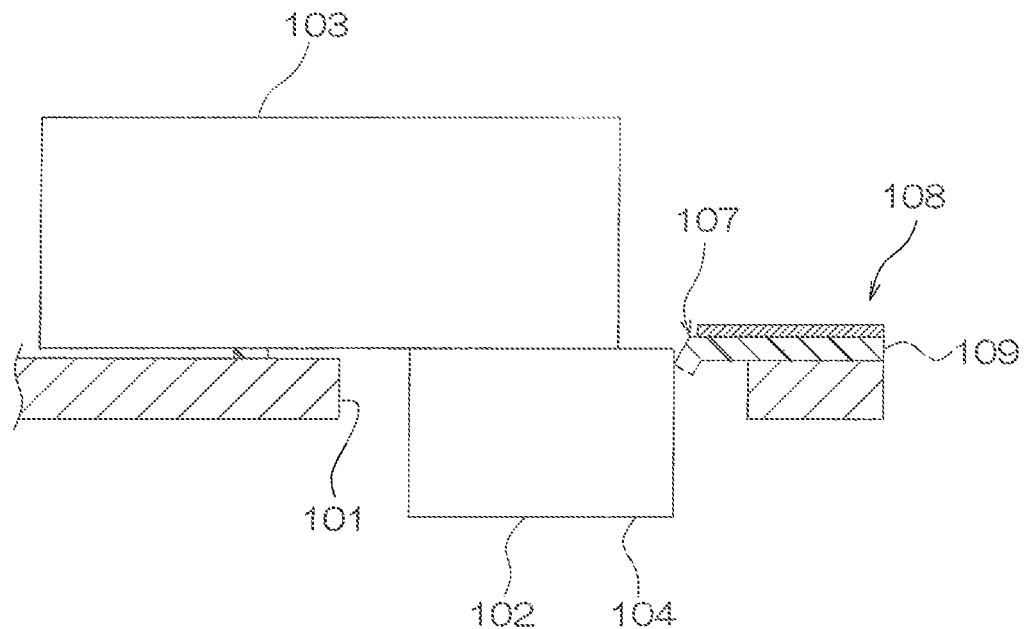
FIG.31
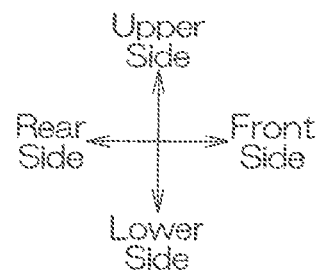

SUSPENSION BOARD WITH CIRCUIT

CROSS-REFERENCE TO RELATED APPLICATION

The present application claims the benefit of U.S. provisional patent application No. 61/634,752 filed on Mar. 6, 2012, and claims priority from Japanese Patent Application No. 2012-033893 filed on Feb. 20, 2012, and Japanese Patent Application No. 2012-275135 filed on Dec. 17, 2012, the contents of which are hereby incorporated by reference into this application.

BACKGROUND OF THE INVENTION

1. Field of the Invention

The present invention relates to a suspension board with circuit, in particular, to a suspension board with circuit for use in a hard disk drive.

2. Description of Related Art

Nowadays, a suspension board with circuit having various electron devices mounted thereon has been proposed, to be specific, for example, electron devices such as a light-emitting device for improving recording density by laser-assisted method, and an inspection device for inspecting positional precision of the magnetic head.

For example, Japanese Unexamined Patent Publication No. 2010-108576 has proposed, a suspension board with circuit such as the following: in a suspension board with circuit formed with passage openings penetrating in the thickness direction, a slider is mounted so as to cover the passage openings, and a light-emitting device is mounted below the slider so as to be inserted in the passage opening.

Furthermore, Japanese Unexamined Patent Publication No. 2009-266365 has proposed, depending on the purpose and use, mounting the light-emitting device on the slider so that a portion of the light-emitting device protrudes from the slider.

SUMMARY OF THE INVENTION

However, as shown in FIG. 31, when the front end portion 104 of the light-emitting device 102 protrudes from the slider 103, when mounting the slider 103 on the suspension board with circuit 108, the rear end portion 107 of the insulating layer 109 facing the passage opening 101 may interfere with the front end portion 104 of the light-emitting device 102. Thus, disadvantageously, the rear end portion 107 of the insulating layer 109 in the suspension board with circuit 108 may be damaged.

An object of the present invention is to provide a suspension board with circuit in which damages to the end portion facing the first opening are prevented, and which is excellent in connection reliability.

A suspension board with circuit of the present invention is a suspension board with circuit for mounting a slider unit including an electron device, the electron device mounted so as to form, when projected in the thickness direction with respect to the slider provided with a magnetic head,
 an overlapping portion that overlaps with the slider, and
 a protruding portion that protrudes from the slider,
wherein the suspension board with circuit is formed with a first opening that penetrates in the thickness direction and accommodates the overlapping portion, and a second opening that communicates with the first opening and accommodates the protruding portion.

It is preferable that the suspension board with circuit of the present invention includes a metal supporting board, and a pedestal interposed between the metal supporting board and the slider.

It is preferable that the suspension board with circuit of the present invention further includes an insulating layer formed on the metal supporting board, and a conductive pattern on the insulating layer, the conductive pattern being electrically connected to the magnetic head and the electron device, wherein the pedestal has a thickness that is smaller than the thickness of the insulating layer corresponding to the conductive pattern.

In the suspension board with circuit of the present invention, it is preferable that the second opening is formed by cutting out a lower portion of an end portion of the insulating layer, the end portion facing the first opening.

In the suspension board with circuit of the present invention, it is preferable that the slider is formed with a third opening that accommodates the end portion of the insulating layer.

In the suspension board with circuit of the present invention, the first opening accommodates the overlapping portion, while the second opening accommodates the protruding portion.

Thus, damages caused by interference of the protruding portion can be prevented.

Thus, the suspension board with circuit is excellently reliable.

BRIEF DESCRIPTION OF THE DRAWINGS

FIG. 10 is a process diagram illustrating a method for producing a suspension board with circuit shown in FIG. 8,
 (a) illustrating a step of preparing a metal supporting board,
 (b) illustrating a step of forming an insulating base layer and a pedestal,
 (c) illustrating a step of forming a conductive pattern,
 (d) illustrating a step of forming an insulating cover layer,
 (e) illustrating a step of forming a support opening, and
 (f) illustrating a step of forming a lower cutout.

FIG. 11 shows a perspective view from above of a mount section on which a slider unit is mounted.

FIG. 12 shows a perspective view from below a mount section on which a slider unit is mounted.

FIG. 13 shows a suspension board with circuit in another embodiment of the present invention (embodiment in which the rear end portion of the upper portion of the insulating base layer is positioned at a more rear-side than the front end face of the front-side portion of the slider) (ref: the cross-sectional view of FIG. 8).

FIG. 17 is a process diagram illustrating a method for producing the suspension board with circuit shown in FIG. 16,
   (a) illustrating a step of preparing a metal supporting board,
   (b) illustrating a step of forming an insulating base layer,
   (c) illustrating a step of forming a conductive pattern including a first conductive portion,
   (d) illustrating a step of forming an insulating cover layer,
   (e) illustrating a step of forming a support opening and a support terminal, and
   (f) illustrating a step of forming a lower cutout.

FIG. 18 shows a plan view of a mount section of a suspension board with circuit in another embodiment of the present invention.

FIG. 19 shows a bottom view of the mount section shown in FIG. 18.

FIG. 20 shows a plan view of a mount section of a suspension board with circuit in another embodiment of the present invention.

FIG. 21 shows a bottom view of the mount section shown in FIG. 20.

FIG. 4).

FIG. 9).

FIG. 25 shows a cross-sectional view taken along line E-E of the suspension board with circuit of FIG. 24.

FIG. 26 shows a cross-sectional view taken along line F-F of the suspension board with circuit of FIG. 24.

FIG. 31 shows a side sectional view of a conventional suspension board with circuit.

DETAILED DESCRIPTION OF THE INVENTION

Figure 1:
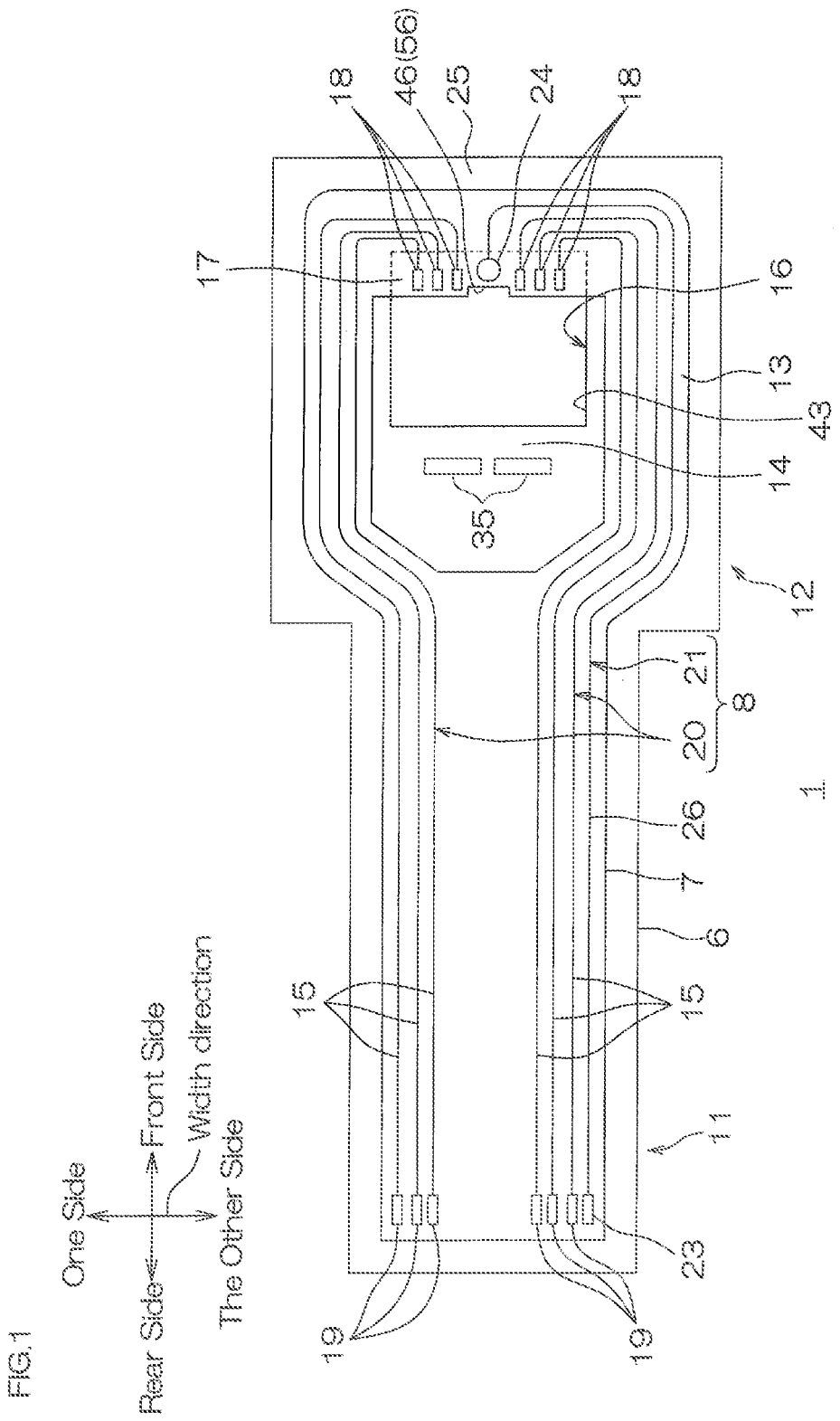
FIG. 1 shows a plan view of a suspension board with circuit in an embodiment of the present invention.
Figure 2:
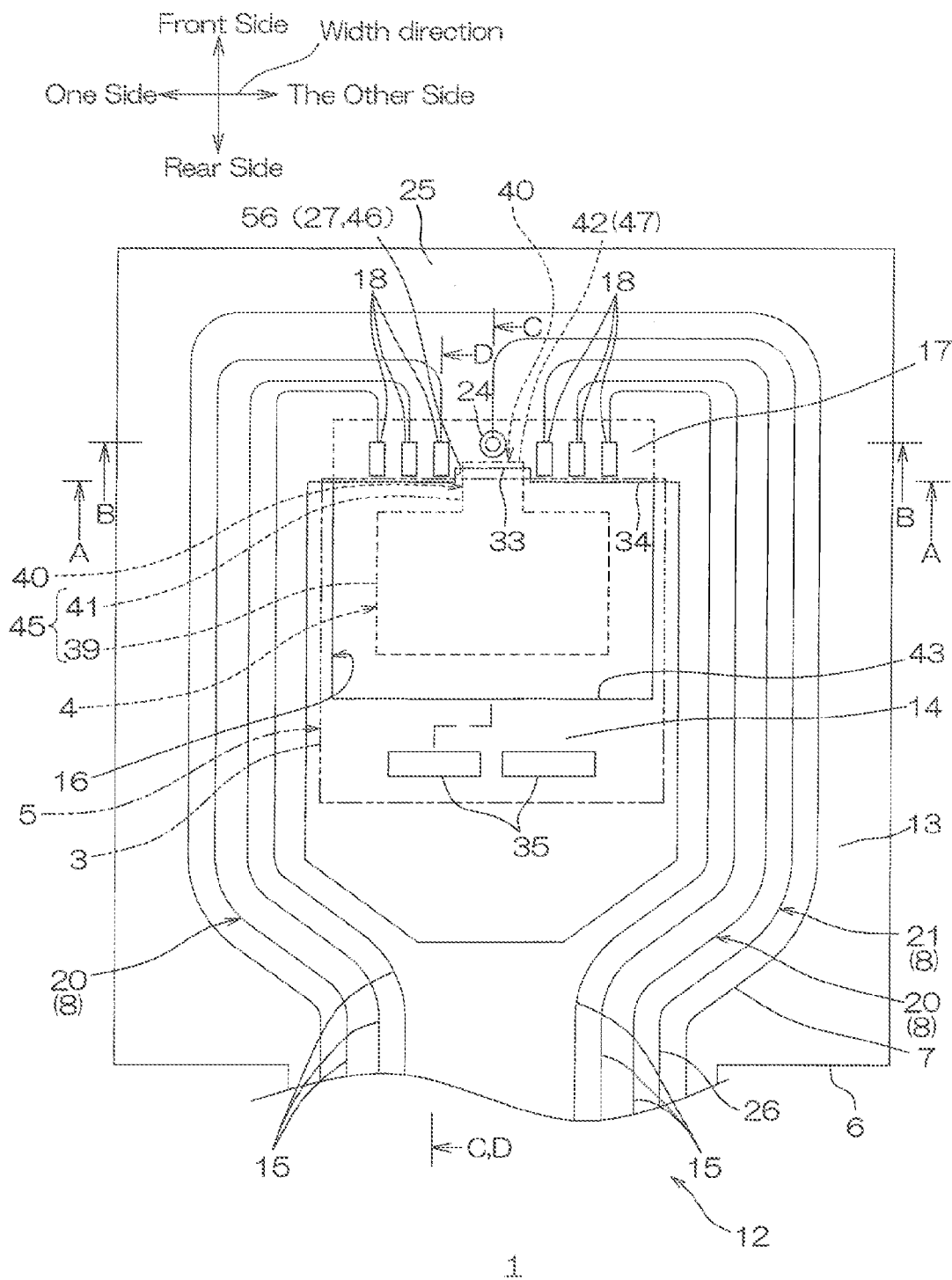
FIG. 2 shows an enlarged plan view of a mount section of the suspension board with circuit shown in FIG. 1.
Figure 3:
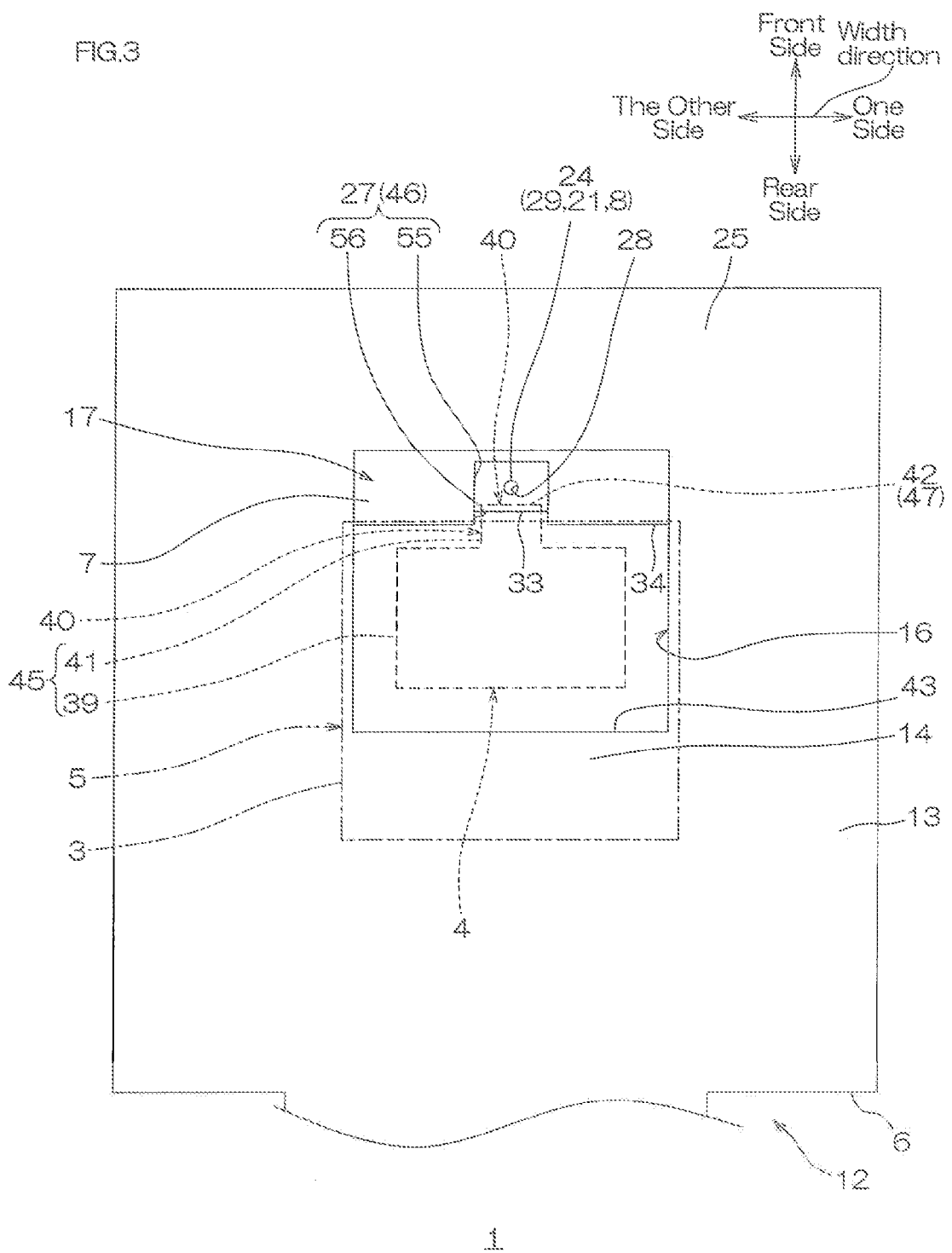
FIG. 3 shows an enlarged bottom view of the mount section of the suspension board with circuit shown in FIG. 1.
Figure 4:
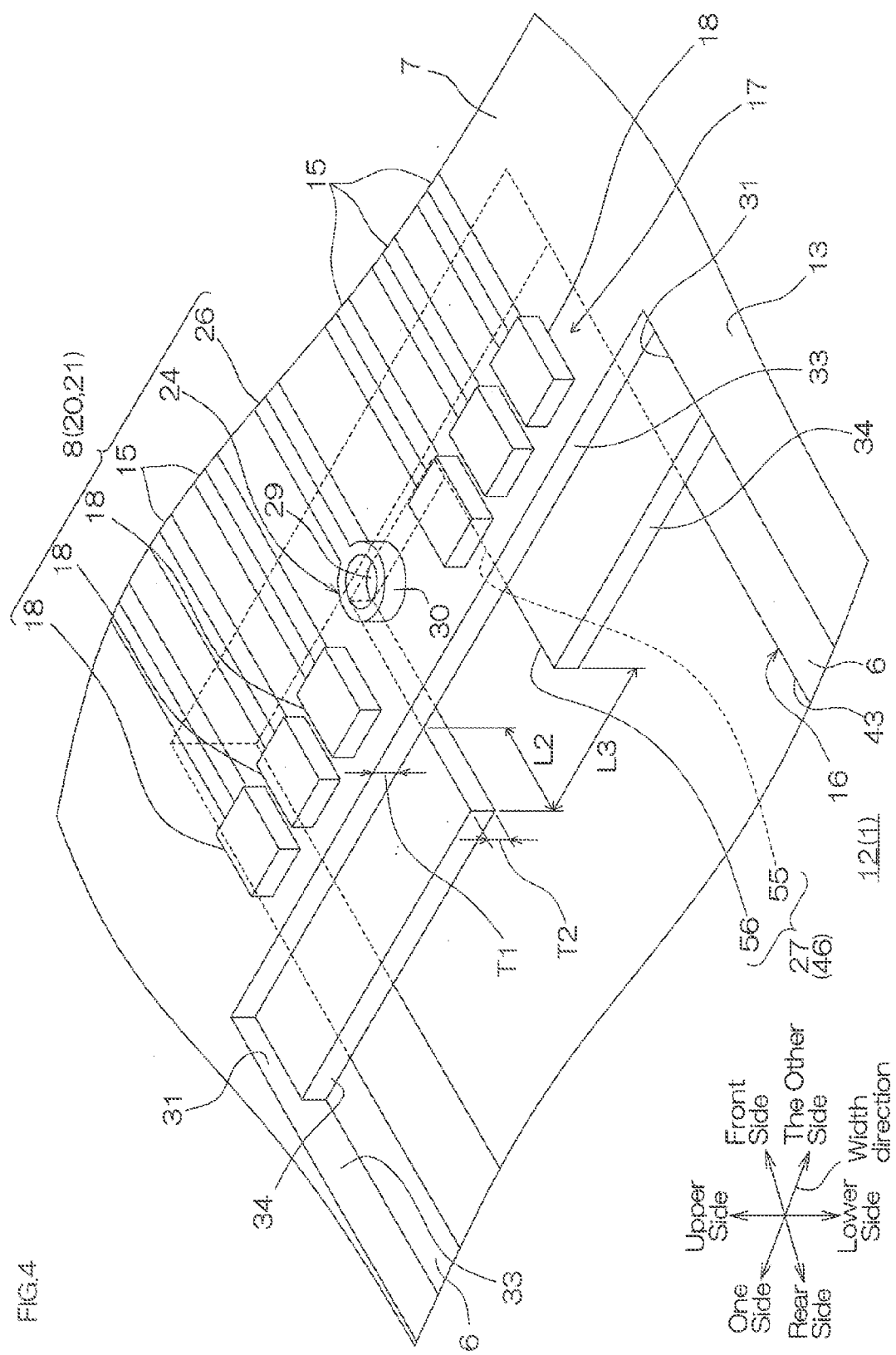
FIG. 4 shows a perspective view from above of the mount section shown in FIG. 2.
Figure 5:
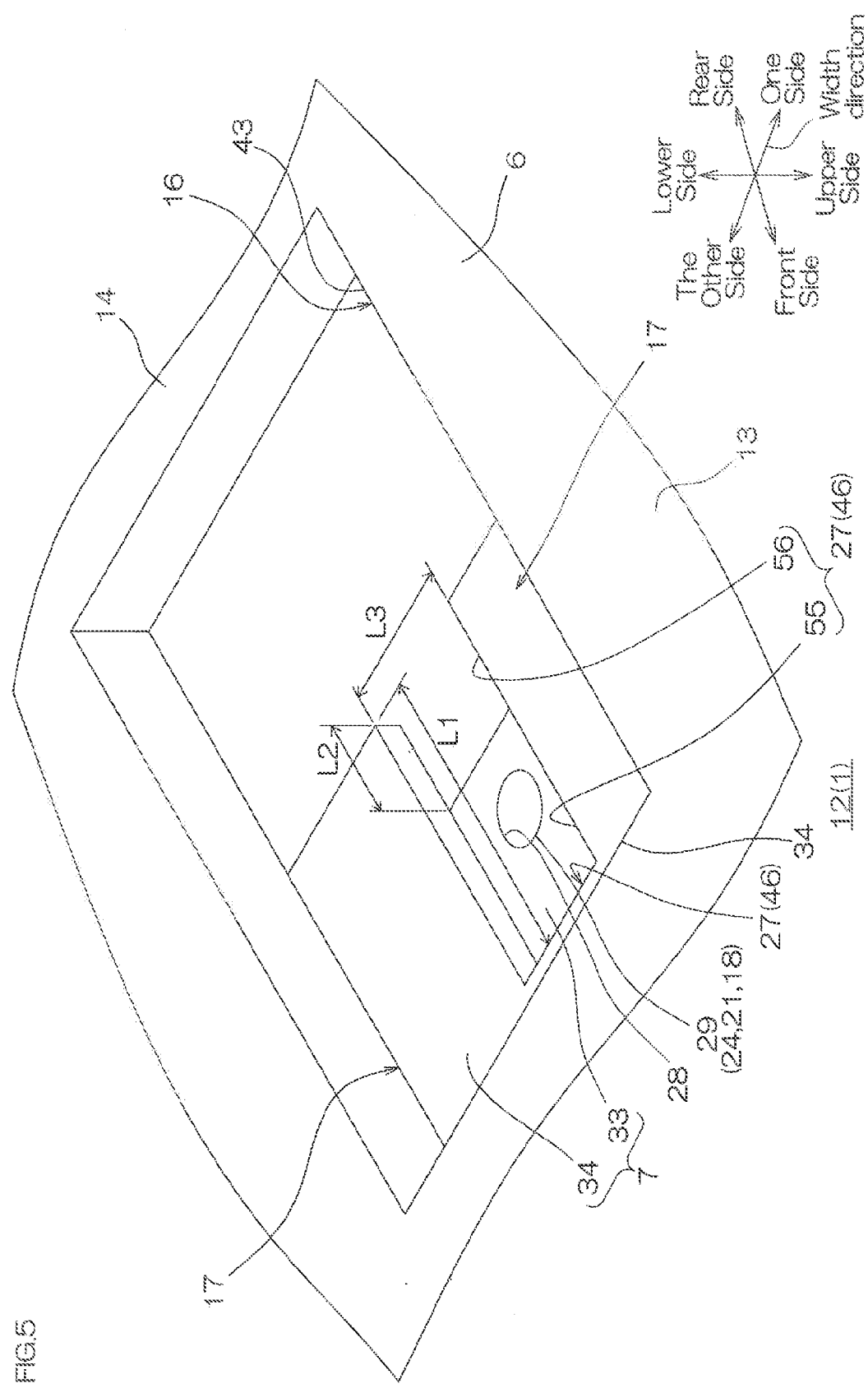
FIG. 5 shows a perspective view from below the mount section shown in FIG. 3.
Figure 6:
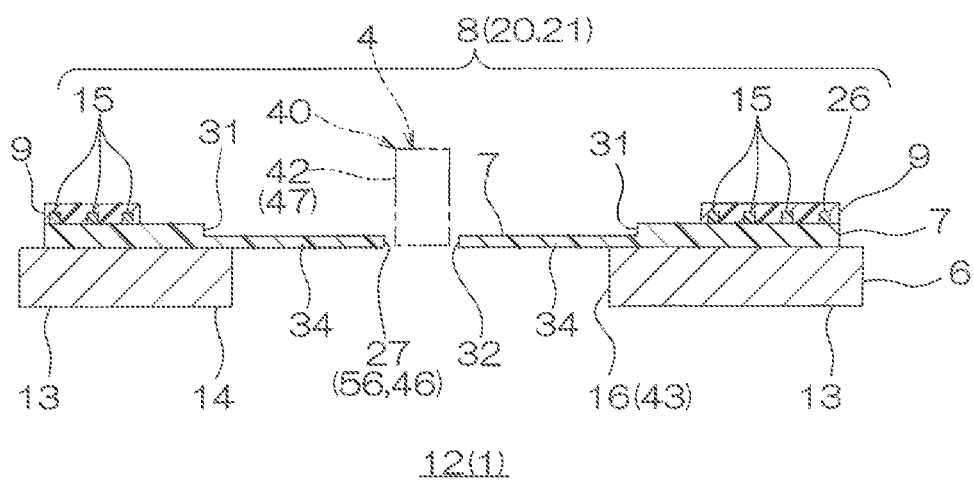
FIG. 6 shows a cross-sectional view taken along line A-A of the suspension board with circuit of FIG. 2.
Figure 7:
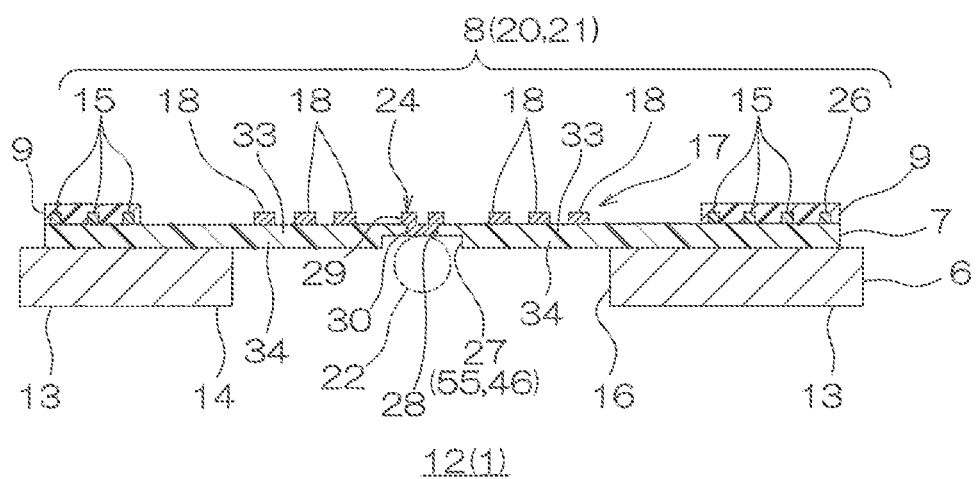
FIG. 7 shows a cross-sectional view taken along line B-B of the suspension board with circuit of FIG. 2.
Figure 8:
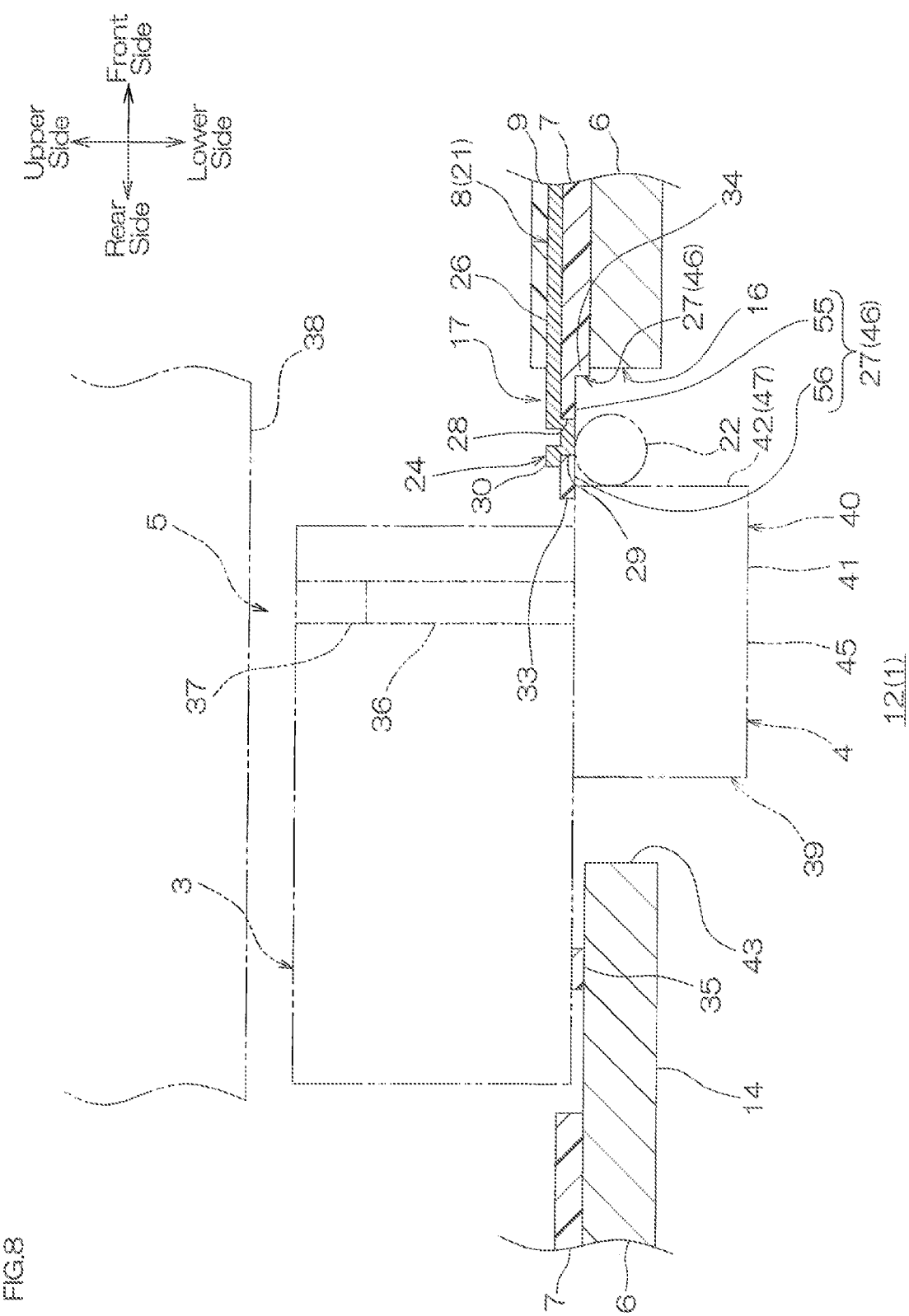
FIG. 8 shows a cross-sectional view taken along line C-C of the suspension board with circuit of FIG. 2.
Figure 9:
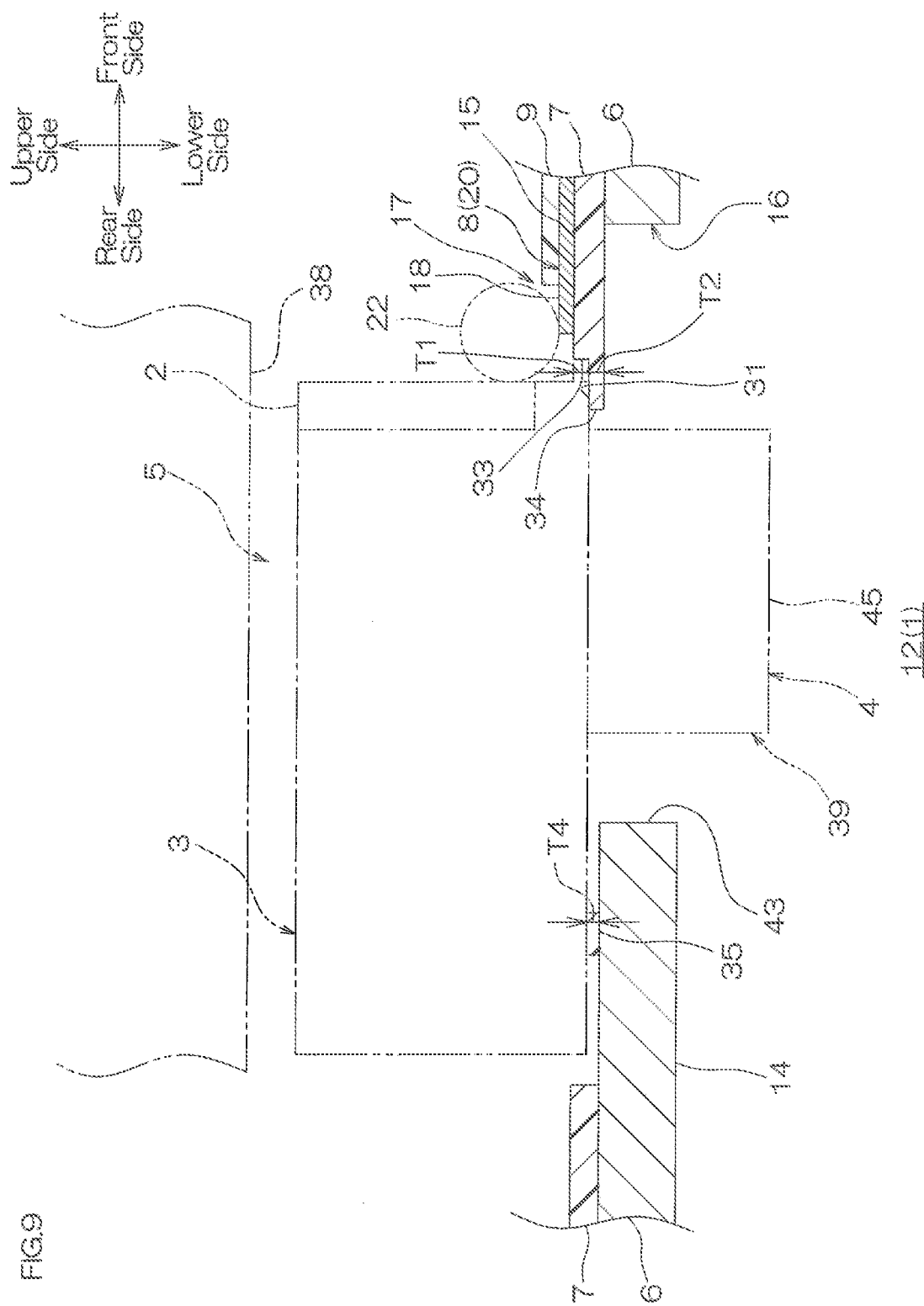
FIG. 9 shows a cross-sectional view taken along line D-D of the suspension board with circuit of FIG. 2.

FIG. 1 shows a plan view of a suspension board with circuit in an embodiment of the present invention; FIG. 2 shows an enlarged plan view of a mount section of the suspension board with circuit shown in FIG. 1; FIG. 3 shows an enlarged bottom view of the mount section of the suspension board with circuit shown in FIG. 1; FIG. 4 shows a perspective view from above of the mount section shown in FIG. 2; FIG. 5 shows a perspective view from below the mount section shown in FIG. 3; FIG. 6 shows a cross-sectional view taken along line A-A of the suspension board with circuit shown in FIG. 2; FIG. 7 shows a cross-sectional view taken along line B-B of the suspension board with circuit shown in FIG. 2; FIG. 8 shows a cross-sectional view taken along line C-C of the suspension board with circuit shown in FIG. 2; FIG. 9 shows a cross-sectional view taken along line D-D of the suspension board with circuit shown in FIG. 2; FIG. 10 is a process diagram illustrating a method for producing the suspension board with circuit shown in shown in FIG. 8; FIG. 11 is a perspective view from above of a mount section on which a slider unit is mounted; and FIG. 12 is a perspective view from below a mount section on which a slider unit is mounted.

In FIGS. 1 and 2, the insulating cover layer 9 to be described later is omitted to clearly show the relative positions of a metal supporting board 6, an insulating base layer 7, and a conductive pattern 8 to be described later.

In FIGS. 1 and 9, a suspension board with circuit 1 (suspension board 1 with circuits) is mounted with a slider unit 5 including a slider 3 mounted with a magnetic head 2, and a light-emitting device 4 as an electron device; and is used for a hard disk drive in which laser-assisted method is used.

In the suspension board with circuit 1, as shown in FIG. 1, a conductive pattern 8 is supported on a metal supporting board 6.

The metal supporting board 6 is formed into a flat belt shape extending in the longitudinal direction, and integrally includes a wiring section 11 disposed at the other side (hereinafter referred to as rear-side) in the longitudinal direction and a mount section 12 disposed at one side (hereinafter referred to as front side) of the wiring section 11 in the longitudinal direction.

The wiring section 11 is formed into a generally rectangular shape extending in the front-rear direction when viewed from the top. The wiring section 11 is formed to have a lower surface as a region mounted on and supported by a load beam (not shown).

The mount section 12 is formed as a region where its lower surface is exposed from the load beam without being mounted on the load beam, when the wiring section 11 is mounted on the load beam. To be specific, the mount section 12 is formed as a region in the suspension board with circuit 1 where the slider unit 5 (ref: phantom line in FIG. 2) is mounted. To be specific, the mount section 12 is formed continuously from the front end of the wiring section 11, and formed into a generally rectangular shape when viewed from the top, expanding outwardly in both width directions (direction perpendicular to the front-rear direction) relative to the wiring section 11.

The mount section 12 is sectioned into an outrigger portion 13, a mount region 14, and a wire turnaround portion 25: when projected in the front-rear direction, the outrigger portion 13 expands outwardly from the wiring section 11 in both width directions; the mount region 14 is formed at an inner side of the outrigger portion 13; and the wire turnaround portion 25 is formed at a front side of the outrigger portion 13 and the mount region 14.

The outrigger portion 13 is a region where the signal wires 15 and a power source wire 26 (described later) of the conductive pattern 8 are provided in the mount section 12, and is a region having a generally rectangular shape extending in the front-rear direction when viewed from the top.

The mount region 14 is disposed at a center in the width direction and front-rear direction of the mount section 12, and is formed into a generally rectangular shape when viewed from the top. A support opening 16 is formed at a center in the front-rear direction of the mount region 14.

The support opening 16 is formed into a generally rectangular shape when viewed from the top, so as to penetrate in the thickness direction of the metal supporting board 6.

In the mount region 14, a terminal-forming region 17 is defined at the front end portion of the support opening 16.

The terminal-forming region 17 has a generally rectangular shape extending in the width direction when viewed from the top, and serves as a region where head-side terminals 18 and a device-side terminal 24 (described later) are formed.

The conductive pattern 8 includes a first conductive pattern 20 and a second conductive pattern 21.

The first conductive pattern 20 integrally includes head-side terminals 18, external-side terminals 19, and signal wires 15 for connecting the head-side terminals 18 and the external-side terminals 19.

A plurality (six) of signal wires 15 are provided in the wiring section 11 along the front-rear direction, and are arranged parallely in the width direction in spaced-apart relation to each other.

In the mount section 12, the signal wires 15 are disposed so that the signal wires 15 reach both outer sides in the width direction of the wire turnaround portion 25 from the front end of the outrigger portion 13; extend toward the inner side in the width direction in the wire turnaround portion 25; thereafter, is turned toward the rear-side to extend toward the rear-side from the center portion in the width direction of the wire turnaround portion 25; and reach the front end portion of the head-side terminals 18 in the terminal-forming region 17.

A plurality (six) of external-side terminals 19 are provided at the rear end portion of the wiring section 11 so that the rear end portions of the signal wires 15 are connected thereto. The external-side terminals 19 are disposed in spaced-apart relation to each other in the width direction. To the external-side terminals 19, an external circuit board (not shown) such as a read/write board is connected.

The head-side terminals 18 are disposed in the terminal-forming region 17 of the mount section 12. A plurality (six) of head-side terminals 18 are provided so as to be connected to the front end portion of the signal wires 15. To be more specific, the head-side terminals 18 are disposed in spaced-apart relation to each other in the width direction.

To the upper surface of the head-side terminal 18, as shown in FIG. 9, a magnetic head 2 is electrically connected through a solder ball 22.

In the first conductive pattern 20, as shown in FIGS. 1 and 9, the write signals transmitted from the external circuit board (not shown) are inputted to the magnetic head 2 through the external-side terminals 19, the signal wires 15, and the head-side terminals 18; and the read signals read with the magnetic head 2 are inputted to the external circuit board (not shown) through the head-side terminals 18, the signal wires 15, and the external-side terminals 19.

The second conductive pattern 21 includes a supply-side terminal 23, a device-side terminal 24, and a power source wire 26 for connecting the supply-side terminal 23 and the device-side terminal 24.

The power source wire 26 is disposed in spaced-apart relation with the signal wires 15 in the width direction in the wiring section 11, and is formed so as to extend in the front-rear direction. To be specific, the power source wire 26 is disposed at the other side in the width direction in spaced-apart relation from the signal wire 15 at the outermost in the width direction (furthest toward the other side).

In the mount section 12, the power source wire 26 is disposed at the other side in the width direction in spaced-apart relation from the signal wire 15 at the outermost in the width direction (furthest toward the other side). In the outrigger portion 13, the power source wire 26 is disposed at the other side in the width direction in spaced-apart relation from the signal wire 15 at the outermost in the width direction (furthest toward the other side). In the wire turnaround portion 25, the power source wire 26 is disposed so as to extend toward the inner side in the width direction (one side); thereafter be turned toward the rear-side to extend toward the rear-side from the center portion in the width direction of the wire turnaround portion 25; and reach the front end portion of the device-side terminal 24 of the terminal-forming region 17.

The supply-side terminal 23 is disposed in spaced-apart relation with the external-side terminal 19. To be specific, the supply-side terminal 23 is disposed in spaced-apart relation in the width direction from the external-side terminal 19 at the outermost in the width direction (furthest toward the other side).

The device-side terminal 24 is disposed at the center in the width direction of the terminal-forming region 17, and is disposed in spaced-apart relation with the head-side terminals 18 in the width direction. To be more specific, the device-side terminal 24 is disposed at an inner side in spaced-apart relation with the two head-side terminals 18 at the inner side in the width direction.

As shown in FIG. 2, the device-side terminal 24 is formed so that its rear end portion overlaps with the head-side terminals 18 when the device-side terminal 24 is projected in the width direction. To be specific, the rear end edge of the device-side terminal 24 is disposed to be anterior to the rear end edge of the head-side terminals 18, and the front end edge of the device-side terminal 24 is disposed to be anterior to the front end edge of the head-side terminals 18.

To the lower surface of the device-side terminal 24, as shown in FIG. 8, the light-emitting device 4 is electrically connected through the solder ball 22.

In the second conductive pattern 21, as shown in FIG. 1, the electric energy supplied from the power source (not shown) is supplied to the light-emitting device 4 (ref: FIG. 8) through the supply-side terminals 23, the power source wire 26, and the device-side terminal 24, to emit high energy light from the light-emitting device 4.

Furthermore, as shown in FIGS. 6 and 7, the suspension board with circuit 1 includes a metal supporting board 6; an insulating base layer 7 as an insulating layer formed on the metal supporting board 6; a conductive pattern 8 formed on the insulating base layer 7; and an insulating cover layer 9 formed on the insulating base layer 7 so as to cover the conductive pattern 8.

The metal supporting board 6 is formed, for example, from metal materials (conductive materials) such as stainless steel, 42-alloy, aluminum, copper-beryllium, and phosphor bronze. Preferably, the metal supporting board 6 is formed from stainless steel. The metal supporting board 6 has a thickness of, for example, 10 to 50 μm, preferably 15 to 25 μm.

The insulating base layer 7 is disposed, as shown in FIG. 1, to span over the wiring section 11 and the mount section 12, and is formed to correspond to the portion where the conductive pattern 8 is formed. To be specific, as shown in FIGS. 1 and 2, the insulating base layer 7 is formed into a pattern that allows the peripheral end edge of the metal supporting board 6, and the rear end edge and the edge of both widthwise sides (excluding the front end edge) of the support opening 16 in the mount section 12 to be exposed. The insulating base layer 7 is formed into a pattern that expose the metal supporting board 6 in the mount region 14 in a generally rectangular shape when viewed from the top.

The insulating base layer 7 is formed, for example, from insulating materials such as synthetic resins including polyimide resin, polyamide-imide resin, acrylic resin, polyethernitrile resin, polyether sulfone resin, polyethylene terephthalate resin, polyethylenenaphthalate resin, and polyvinyl chloride resin. Preferably, the insulating base layer 7 is formed from polyimide resin.

The insulating base layer 7 has a thickness of, for example, 6 to 17 μm, preferably 8 to 12 μm.

The conductive pattern 8 is formed, for example, from conductive materials such as copper, nickel, gold, solder, or alloys thereof. Preferably, the conductive pattern 8 is formed from copper.

The conductive pattern 8 has a thickness of, for example, 3 to 50 μm, preferably 5 to 20 μm.

The signal wires 15 and the power source wire 26 shown in FIG. 1 have a width of, for example, 8 to 300 μm, preferably 10 to 200 μm. The interval between the signal wires 15 is, for example, 8 to 2000 μm, preferably 10 to 1000 μm. The interval between the power source wire 26 and the signal wire 15 at the outermost in the width direction (toward the other side) is, for example, 8 to 2000 μm, preferably 10 to 1000 μm.

The head-side terminals 18, external-side terminals 19, supply-side terminal 23 and device-side terminals 24 have a width of, for example, 20 to 1000 μm, preferably 30 to 800 μm. The interval between the head-side terminals 18; the intervals between the external-side terminals 19; the interval between the supply-side terminal 23 and the external-side terminal 19 at the outermost in the width direction (toward the other side); and the interval between the device-side terminal 24 and the two head-side terminals 18 at inner sides in the width direction are, for example, 20 to 1000 μm, preferably 30 to 800 μm.

The insulating cover layer 9 is disposed to span over the wiring section 11 and the mount section 12, as shown in FIGS. 6 and 7, and is formed to correspond to the portion where the conductive pattern 8 is formed. To be specific, the insulating cover layer 9 is formed into a pattern that covers the signal wires 15 and the power source wire 26, and exposes the head-side terminal 18, the external-side terminal 19 (ref: FIG. 1), the supply-side terminal 23 (ref: FIG. 1), and the device-side terminal 24.

The insulating cover layer 9 is formed from the insulating material given as examples of the insulating material for the above-described insulating base layer 7. The insulating cover layer 9 has a thickness of, for example, 1 to 40 μm, preferably 1 to 10 μm.

Next, the terminal-forming region 17 and its surrounding areas are described in detail.

The terminal-forming region 17 is, as shown in FIGS. 3 to 5, a region where the insulating base layer 7 exposed from the support opening 16 of the metal supporting board 6 is provided.

As shown in FIGS. 2 and 4, on the insulating base layer 7 in the terminal-forming region 17, the head-side terminals 18 and the device-side terminal 24 are formed.

Furthermore, as shown in FIGS. 4 and 9, an upper cutout 31 is formed in the insulating base layer 7. The upper cutout 31 is formed by cutting out, in the width direction, the upper side portion of the rear end portion of the insulating base layer 7 in the terminal-forming region 17 and the outsides thereof in the width direction of the terminal-forming region 17. The upper cutout 31 has a generally rectangular shape when viewed in side cross section, and is formed at the rear-side of the head-side terminals 18 and the device-side terminal 24 in spaced-apart relation. The width of the upper cutout 31 is formed to be larger than the width of the support opening 16, to be specific, as shown in FIG. 4, the upper cutout 31 is formed to go across the both end faces in the width direction of the support opening 16 when projected in the thickness direction.

When the insulating base layer 7 is projected in the front-rear direction, the upper portion 33 is defined as a portion that overlaps with the upper cutout 31; and the lower portion 34 is defined as a portion that does not overlap with the upper cutout 31, and formed below the upper portion 33.

Furthermore, as shown in FIGS. 5 and 8, a lower cutout 27 is formed in the insulating base layer 7. The lower cutout 27 is formed by cutting out, in the front-rear direction, the lower portion 34 of the center portion in the width direction of the insulating base layer 7 in the terminal-forming region 17. That is, lower cutout 27 is formed, so as to cut out the lower portion 34 of the rear end portion of the insulating base layer 7 facing the support opening 16, into a generally rectangular shape when viewed from the bottom. The lower cutout 27 is formed so as to communicate with the support opening 16. The lower cutout 27 is formed by cutting out the lower portion 34 so as to allow the front side end edge of the insulating base layer 7 facing the support opening 16 to remain slightly. Furthermore, as shown in FIG. 7, the lower cutout 27 is formed into a generally rectangular shape when viewed in front cross section.

Furthermore, as shown in FIG. 4, at the lower cutout 27 of the insulating base layer 7, the portion covered with the upper portion 33 is regarded as a front-side portion 55 (broken line), and the portion exposed from the upper portion 33 is regarded as a rear-side portion 56. The rear-side portion 56 is adjacent to the front-side portion 55 at the rear-side of the front-side portion 55, communicates with the front-side portion 55, and is formed into a generally rectangular shape when viewed from the top, penetrating in the thickness direction.

Then, as shown in FIG. 3, the lower cutout 27, that is, the front-side portion 55 and the rear-side portion 56, forms a second opening 46 that accommodates a light-emitting device 4 to be described later.

Furthermore, in the upper portion 33, as shown in FIGS. 5 and 7, a base through hole 28 is formed, at a center in the front-rear direction of the terminal-forming region 17, and at a portion overlapping the front-side portion 55 in the thickness direction. The base through hole 28 penetrates the upper portion 33 in the thickness direction, and is formed into a generally circular shape when viewed from the top.

A portion of the device-side terminal 24 is charged in the base through hole 28. That is, as shown in FIGS. 4 and 8, the device-side terminal 24 integrally includes a filling portion 29 filling the base through hole 28, and an expanding portion 30 expanding upwardly and outwardly from the peripheral end portion of the filling portion 29.

The lower surface of the filling portion 29 is exposed from the base through hole 28 to the lower side, and formed to be flush with the lower surface of the upper portion 33 of the surrounding of the filling portion 29 in the surface direction (front-rear direction and width direction).

In the support opening 16, as shown in FIG. 3, the region at the rear-side from the rear end face of the lower portion 34 forms the first opening 43 that accommodates a main body portion 39 of the light-emitting device 4 to be described later.

The sizes of the insulating base layer 7 at the terminal-forming region 17 and its surrounding areas are suitably selected, and as shown in FIG. 4, for example, the upper portion 33 has a thickness (that is, the thickness of the upper cutout 31) T1 of, for example, 1 to 14 μm, preferably 2 to 10 μm; and the lower portion 34 has a thickness (that is, the thickness of the lower cutout 27) T2 of, i.e., a value deducting the thickness T1 of the upper portion 33 from the thickness of the insulating base layer 7, to be specific, 1 to 16 μm, preferably 2 to 10 μm.

Furthermore, as shown in FIG. 5, the lower cutout 27 has a front-rear direction length L1 of, for example, 30 to 300 μm, preferably 40 to 200 μm, and has a width L3 of, for example, 50 to 500 μm, preferably 100 to 300 μm.

The suspension board with circuit 1 further includes, as shown in FIG. 2, pedestals 35.

The pedestals 35 are provided at a rear-side portion in the mount region 14. To be more specific, two pedestals 35 are disposed at a rear-side of the support opening 16 in spaced-apart relation to each other in the width direction.

The pedestals 35 are formed into a generally rectangular shape extending in the width direction when viewed from the top.

The pedestals 35 are formed from the same insulating material as that of the insulating base layer 7.

As shown in FIG. 9, the pedestals 35 have a thickness T4 that is smaller than the thickness of the insulating base layer 7 (T1+T2), to be specific, the same thickness as the thickness T2 of the lower portion 34.

Next, description is given below of a method for producing a suspension board with circuit 1 with reference to FIG. 10.

In this method, as shown in FIG. 10(*a*), first, a metal supporting board 6 in the form of a flat plate is prepared.

Next, in this method, as shown in FIG. 10(*b*), the insulating base layer 7 is formed on the upper surface of the metal supporting board 6 into the above-described pattern having the upper cutout 31 (ref: FIG. 4 and FIG. 9).

To be specific, a varnish of photosensitive insulating material is applied on the entire upper surface of the metal supporting board 6 and dried. Thereafter, the varnish is exposed to light (to be specific, gradation exposure) and allows development, and then heated to be cured, thereby producing the insulating base layer 7 into the above-described pattern.

At the portion corresponding to the filling portion 29 (ref: FIG. 10(*c*) to be described later), a depressed portion 50 having a thickness smaller than the surrounding is formed.

At this point, the insulating base layer 7 does not have a lower cutout 27 (ref: FIG. 10(*f*) to be described later) formed.

Furthermore, at the same time with the formation of the insulating base layer 7, the pedestal 35 is formed on the upper surface of the metal supporting board 6 into the above-described pattern.

Next, in this method, as shown in FIG. 10(*c*), the conductive pattern 8 is formed on the insulating base layer 7 including the depressed portion 50 by additive method or subtractive method.

Then, as shown in FIG. 10(*d*), the insulating cover layer 9 is formed on the insulating base layer 7 into the above-described pattern.

To be specific, a varnish of photosensitive insulating material is applied on the entire upper surface of the insulating base layer 7 including the conductive pattern 8 and dried. Thereafter the varnish is exposed to light and allows development, and then heated to be cured, thereby forming the insulating cover layer 9 into the above-described pattern.

Then, as shown in FIG. 10(*e*), the support opening 16 is formed on the metal supporting board 6.

The support opening 16 is formed, for example, by etching such as dry etching and wet etching; drilling; and laser processing. Preferably, the support opening 16 is formed by wet etching.

The lower surface of the insulating base layer 7 at the terminal-forming region 17 is exposed in this manner.

Then, as shown in FIG. 10(*f*), the lower cutout 27 is formed in the insulating base layer 7.

To be specific, the center portion of the lower portion 34 of the insulating base layer 7 in the terminal-forming region 17 is removed by etching such as dry etching and wet etching; drilling; and laser processing.

The lower portion 34 of the surrounding of the depressed portion 50 is removed in this manner, thus forming the base through hole 28 filled with the filling portion 29, and thus allowing the lower surface of the filling portion 29 to expose from the base through hole 28.

In this manner, the device-side terminal 24 is formed.

The suspension board with circuit 1 is obtained in this manner.

On the suspension board with circuit 1, as shown by the phantom line in FIG. 2, FIG. 3, and FIG. 8, a slider unit 5 is mounted.

The slider unit 5 includes a slider 3, and a light-emitting device 4.

As shown by the phantom line in FIG. 8, the slider 3 is provided on the metal supporting board 6 in the mount region 14, so that the slider 3 float in minutely spaced-apart relation while running relatively to the magnetic disk 38 of the hard disk drive. The slider 3 has a generally rectangular shape when viewed in side cross section, and as shown in FIGS. 2 and 9, when projected in the thickness direction, formed into a generally rectangular shape when viewed from the top, covering the support opening 16, the mount region 14 at a rear-side of the support opening 16, and the rear end portion of the lower portion 34. As shown in FIGS. 9 and 11, the front end portion of the slider 3 is in abutment (contact) with the upper surface of the lower portion 34 so as to fit in the upper cutout 31.

The rear end portion of the slider 3 is supported by the upper surface of the pedestal 35. That is, the rear end portion of the slider 3 is set on the metal supporting board 6 so that the pedestals 35 are interposed therebetween.

The slider 3 is provided with, as shown in FIGS. 8 and 9, a magnetic head 2, an optical waveguide 36, and a near-field light generator 37.

The magnetic head 2 is formed at an upper portion of the front end portion of the slider 3, faces the magnetic disk 38 shown by the phantom line in FIG. 9, and is provided so that read/write can be performed relative to the magnetic disk 38.

The optical waveguide 36 is provided, as shown in FIG. 8, above the light-emitting device 4 to be described next, and is formed to extend in the thickness direction.

At the upper end of the optical waveguide 36, the near-field light generator 37 is provided. The optical waveguide 36 allows the light emitted from the light-emitting device 4 to enter the near-field light generator 37.

The near-field light generator 37 is provided above the optical waveguide 36. The near-field light generator 37 is composed of a metal scatterer, an opening, etc. and for example, a known near-field light generating device such as the ones described in Japanese Unexamined Patent Publication No. 2007-280572, Japanese Unexamined Patent Publication No. 2007-052918, Japanese Unexamined Patent Publication No. 2007-207349, and Japanese Unexamined Patent Publication No. 2008-130106 is used.

The near-field light generator 37 generates near-field light from the light entered from the optical waveguide 36, and the near-field light is applied to the magnetic disk 38 to heat a microscopic region of the magnetic disk 38.

The light-emitting device 4 is a light source for allowing light to enter the optical waveguide 36, for example, a light source that converts electric energy to light energy, and allows high energy light to exit from an exit opening.

The light-emitting device 4 is provided at a lower surface of the slider 3. To be specific, as shown by the broken line in FIG. 2 and FIG. 3, the light-emitting device 4 is formed into a generally T-shape when viewed from the bottom, and integrally includes a main body portion 39 having a generally rectangular shape extending in the width direction when viewed from the bottom, and a protrusion portion 40 that protrudes toward the front side from the center of the main body portion 39 in the width direction.

The main body portion 39 is disposed so as to be included in the slider 3 when projected in the thickness direction, to be specific, as shown in FIGS. 8 and 9, disposed at the lower surface of the front-side portion of the slider 3.

As shown in FIGS. 2 and 3, a rear-side portion 41 of the protrusion portion 40 is disposed at the lower surface of the slider 3 so as to be included in the slider 3 when projected in the thickness direction. On the other hand, a front-side portion 42 of the protrusion portion 40 is formed to protrude to the front side from the front end face of the slider 3 so as to be exposed from the slider 3. That is, the front-side portion 42 serves as a protruding portion 47 protruding from the slider 3.

The main body portion 39 and the rear-side portion 41 of the protrusion portion 40 serve as an overlapping portion 45 overlapping with the slider when projected in the thickness direction.

On the other hand, the front-side portion 42 of the protrusion portion 40 is disposed, as shown in FIGS. 3 and 12, so as to be accommodated in the lower cutout 27 of the insulating base layer 7.

The front-side portion 42 is disposed, as shown in FIG. 3, between the lower portions 34 sandwiching, in the width direction, the lower cutout 27 of the insulating base layer 7, in spaced-apart relation to the lower portions 34. The upper end face of the front-side portion 42 is, as shown in FIG. 8, in abutment (surface contact) with the lower surface of the upper portion 33.

As shown in FIG. 12, width L4 of the protrusion portion 40 is formed to be smaller than width L3 (ref: FIG. 5) of the lower cutout 27. For example, width L4 of the protrusion portion 40 is 90% or less, preferably 80% or less, and 50% or more with respect to width 3, to be specific, 50 to 400 μm, preferably 100 to 300 μm.

In the suspension board with circuit 1, as shown in FIG. 8, the first opening 43 accommodates the overlapping portion 45, and the second opening 46 accommodates the protruding portion 47.

Therefore, damages due to the interference by the protruding portion 47 can be prevented.

Thus, the suspension board with circuit 1 is excellently reliable.

In the embodiment of FIG. 1, the number of the signal wires 15, the head-side terminals 18, and the external-side terminals 19 is described as 6, but the number is not particularly limited, and for example, can be set to 12 to 14.

In the embodiment of FIG. 2, the device-side terminal 24 is formed at the center of the terminal-forming region 17 in the width direction, but the position thereof is not particularly limited, and for example, the device-side terminal 24 can also be formed at an end portion in the width direction of the terminal-forming region 17.

In the embodiment of FIG. 7, the insulating cover layer 9 is formed into a pattern that allows the device-side terminal 24 to be exposed, and for example, although not shown, the insulating cover layer 9 can be formed into a pattern that covers the device-side terminal 24.

In the embodiment of FIG. 5, the base through hole 28 is formed into a generally circular shape when viewed from the top, but the shape when viewed from the top is not particularly limited. For example, although not shown, the base through hole 28 can be formed into a generally circular shape when viewed from the top, or a generally polygonal shape when viewed from the top (to be specific, generally rectangular shape when viewed from the top).

Furthermore, in the embodiment of FIG. 2, two pedestals 35 are provided in spaced-apart relation to each other in the width direction, and each of the pedestals 35 is formed into a generally rectangular shape when viewed from the top. However, the number of the pedestals 35, and their position and shape are not particularly limited.

FIG. 13 shows a suspension board with circuit in another embodiment of the present invention (embodiment in which the rear end portion of the upper portion of the insulating base layer is positioned at a more rear side than the front end face of the front-side portion of the slider) (ref: the cross-sectional view of FIG. 8).

In the following figures, members corresponding to the above-described elements are designated with the same reference numerals, and detailed descriptions thereof are omitted.

In the embodiment shown by the phantom line in FIG. 8, the slider 3 is formed into a generally rectangular shape when viewed in side cross section, but for example, as shown in FIG. 13, the slider 3 can be formed with a slider cutout 48 as a third opening at a lower end portion of the front end portion.

In FIG. 13, the slider cutout 48 is cut out, toward a rear side from the lower end portion of the front end face of the slider 3, into a generally rectangular shape when viewed in side cross section and the slider cutout 48 is formed across the entire width of the slider 3. The size of the slider cutout 48 is set so that the slider cutout 48 can accommodate the rear end portion of the upper portion 33 of the insulating base layer 7. To be specific, the slider cutout 48 has a thickness of, for example, 5 to 50 μm, preferably 10 to 35 μm, and has a length in the front-rear direction of, for example, 5 to 50 μm, preferably 10 to 35 μm.

In the embodiment of FIG. 13, the same operations and effects as that of the embodiment of FIG. 8 can be achieved, and furthermore, even if the rear end portion of the upper portion 33 of the insulating base layer 7 is positioned at a rear-side than the front end face of the slider 3 when projected in the thickness direction, contacts between them can be prevented, and damages due to the contacts can be prevented.

Figure 14:
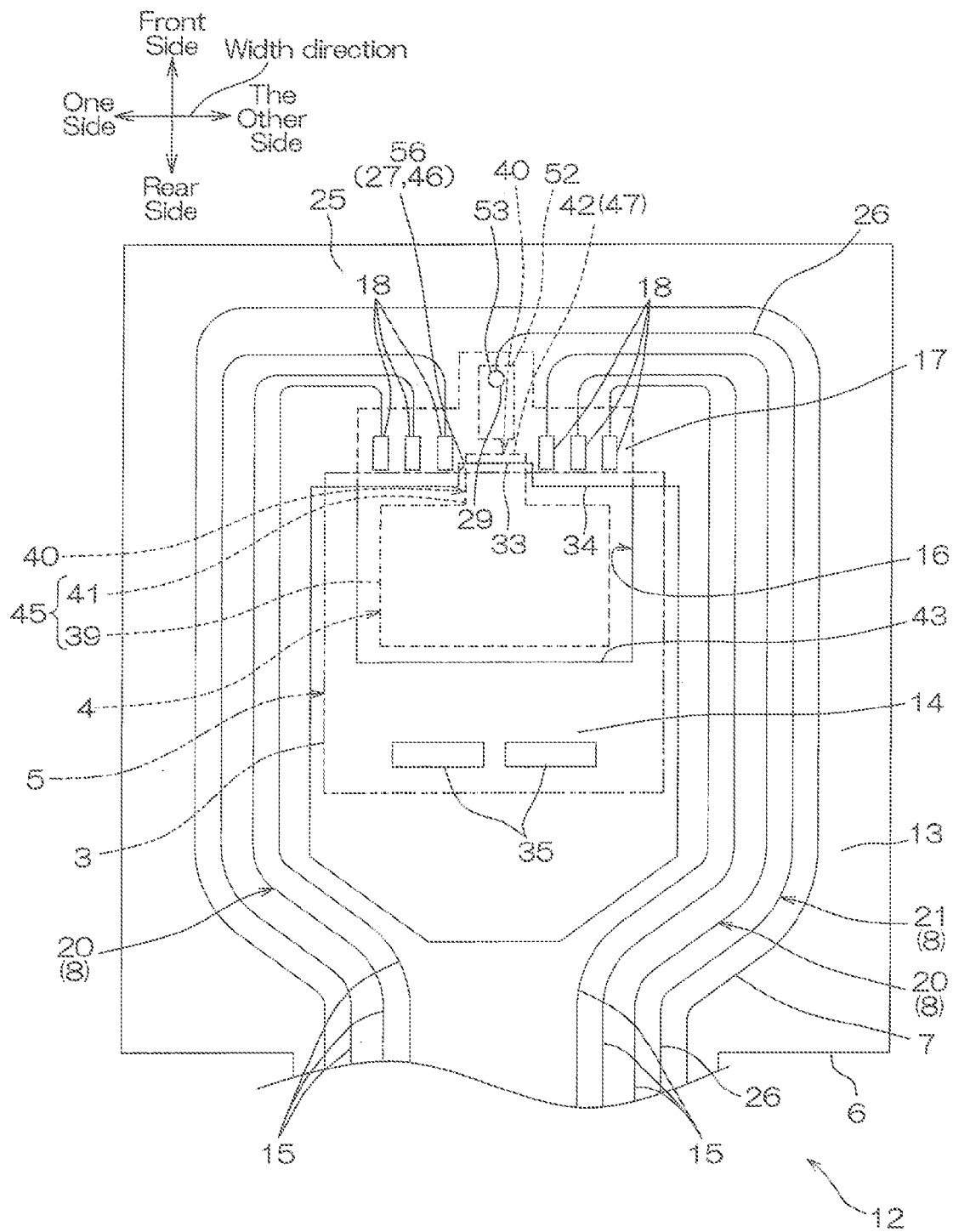
FIG. 14 shows a plan view of a mount section of a suspension board with circuit in another embodiment of the present invention.
Figure 15:
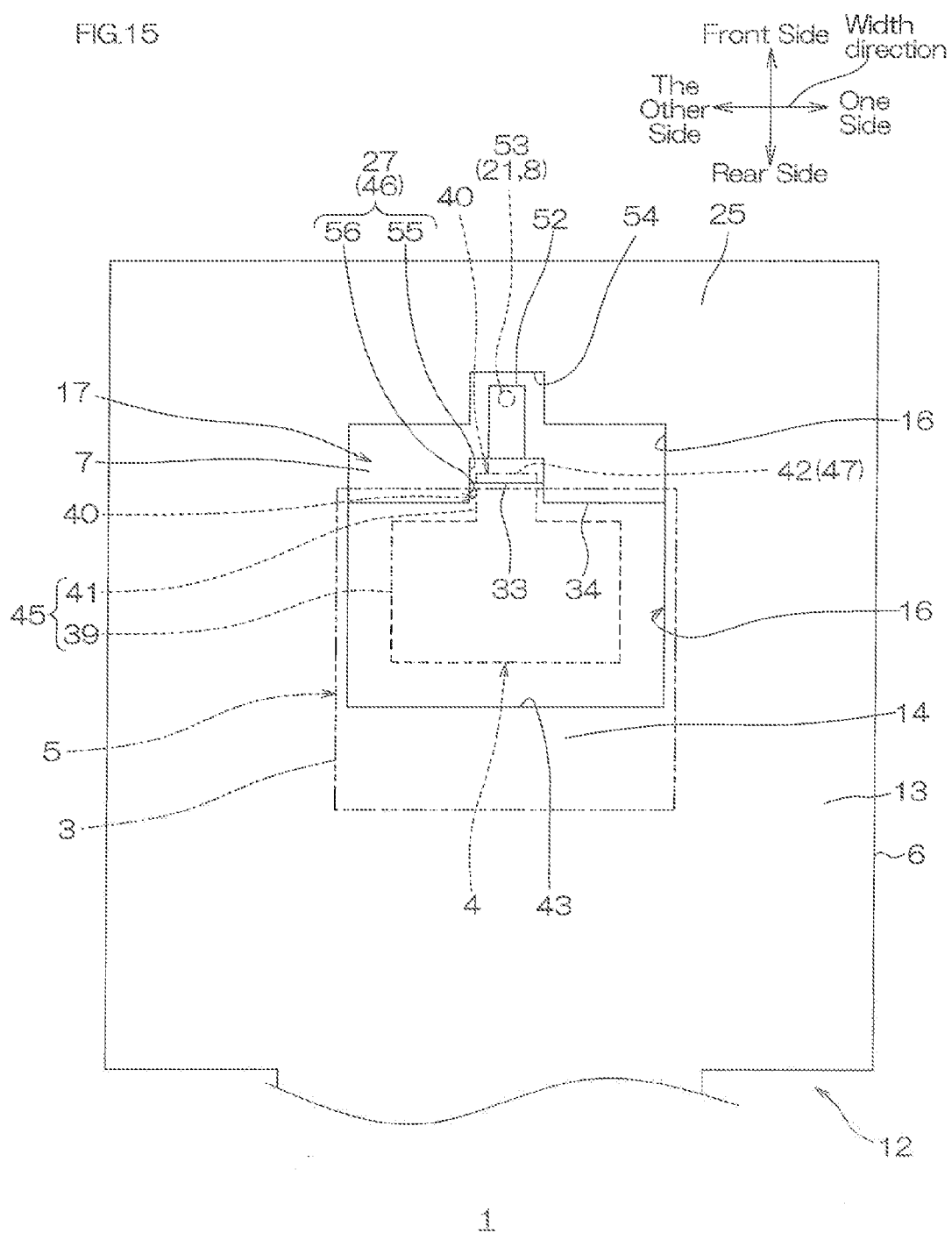
FIG. 15 shows a bottom view of the mount section shown in FIG. 14.
Figure 16:
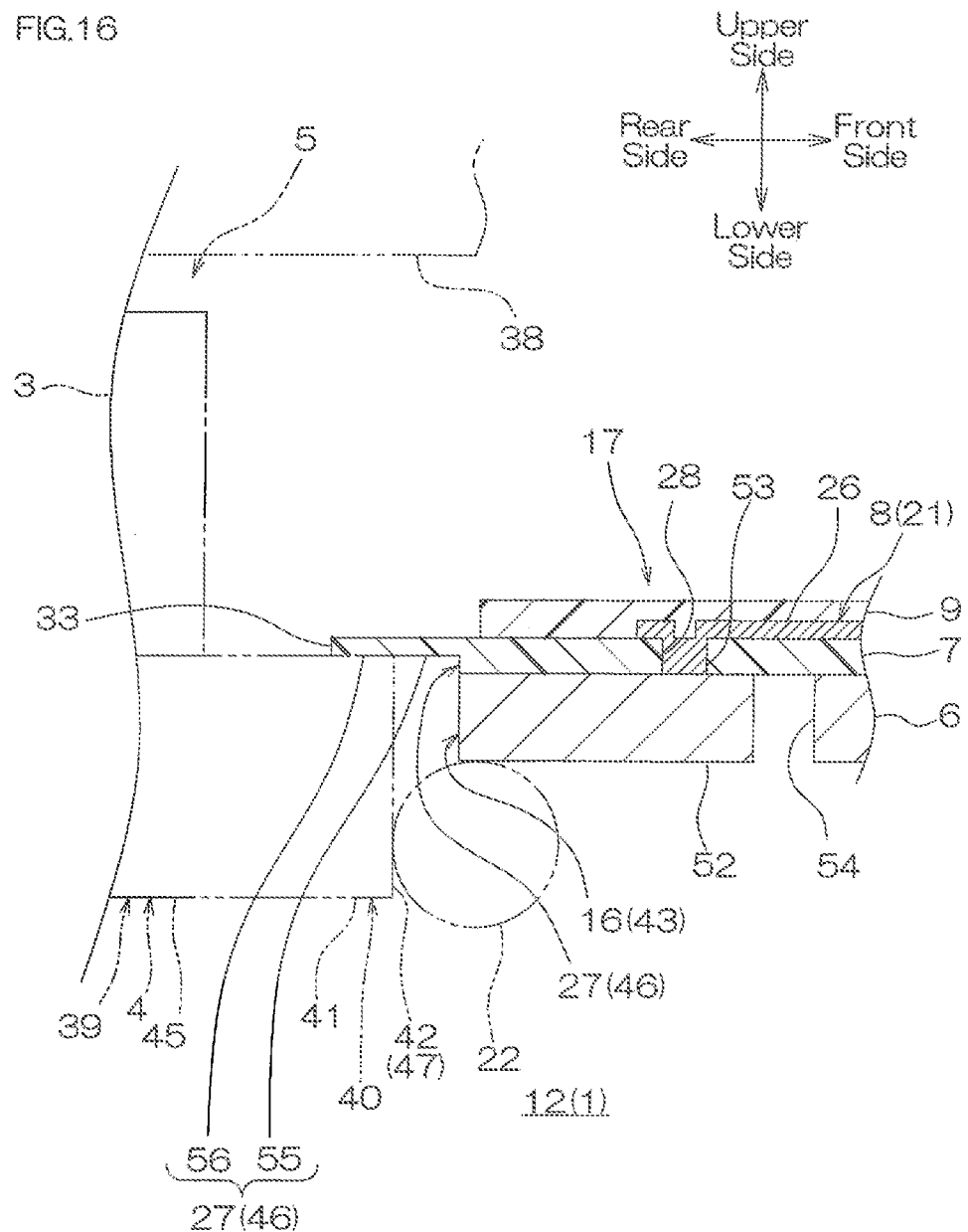
FIG. 16 shows a side sectional view of the mount section shown in FIG. 14.

FIG. 14 shows a plan view of a mount section of a suspension board with circuit in another embodiment of the present invention, FIG. 15 is a bottom view of the mount section shown in FIG. 14, FIG. 16 is a side sectional view of the mount section shown in FIG. 14, and FIG. 17 shows a process diagram illustrating a method for producing a suspension board with circuit shown in FIG. 16.

In the embodiment of FIG. 8, the device-side terminals 24 are formed into the conductive pattern 8, but for example, as shown in FIG. 16, the support terminal 52 can be formed so that the support terminal 52 shares the same layer with the metal supporting board 6.

In FIG. 14, the second conductive pattern 21 includes the first conductive portion 53 electrically connected with the power source wire 26. The first conductive portion 53 is formed into the same shape as that of the device-side terminal 24 in FIG. 8. The upper surface of the first conductive portion 53 is, as shown in FIG. 16, covered with the insulating cover layer 9. A support terminal 52 is provided at the lower end of the first conductive portion 53.

The support terminal 52 is formed at the lower surface of the first conductive portion 53 exposed from the base through hole 28, and at the lower surface of the insulating base layer 7 surrounding the first conductive portion 53. The support terminal 52 is formed, as shown in FIG. 15, into a generally rectangular shape extending in the front-rear direction when viewed from the bottom, and is disposed in spaced-apart relation with the surrounding metal supporting board 6.

The support terminal 52 is formed from the same metal material (conductive material) as the metal material that forms the metal supporting board 6, and as shown in FIG. 16, the thickness of the support terminal 52 is same as the thickness of the metal supporting board 6.

The support terminal 52 is electrically connected with the power source wire 26 through the first conductive portion 53. On the other hand, the support terminal 52 is insulated from the surrounding metal supporting board 6.

Although not shown in FIG. 16, a metal thin layer composed of, for example, metals such as gold, and nickel and having a suitable thickness can be formed on the surface (lower surface and side surface) of the support terminal 52.

As shown in FIG. 15, the support opening 16 is formed into a generally T-shape when viewed from the bottom, with the center of its front end face in the width direction protruding toward a front side serving as a protrusion portion 54 protruding to have a generally rectangular shape when viewed from the bottom. A support terminal 52 is formed at an inner side in the width direction of the protrusion portion 54. Furthermore, as shown in FIGS. 15 and 16, the rear end face of the support terminal 52 is formed to be flush with the front end face of the lower cutout 27 in the thickness direction.

Next, description is given below of a method for producing the suspension board with circuit 1 shown in FIG. 16 with reference to FIG. 17.

In this method, as shown in FIG. 17(a), first, a metal supporting board 6 of a flat plate is prepared.

Next, in this method, as shown in FIG. 17(b), an insulating base layer 7 is formed into the above-described pattern having an upper cutout 31 (ref: FIG. 9) and a base through hole 28 on the upper surface of the metal supporting board 6.

Next, in this method, as shown in FIG. 17(c), a conductive pattern 8 including a first conductive portion 53 is formed at the upper surface of the insulating base layer 7 and the inner surface of the base through hole 28.

Then, as shown in FIG. 17(d), an insulating cover layer 9 is formed so as to cover at least the first conductive portion 53.

Then, as shown in FIG. 17(e), a support opening 16 is formed in the metal supporting board 6.

In this manner, the support terminal 52 is formed.

Then, as shown in FIG. 17(f), a lower cutout 27 is formed in the insulating base layer 7.

The suspension board with circuit 1 is obtained in this manner.

Then, as shown by the phantom line in FIG. 16, the slider unit 5 is mounted on the suspension board with circuit 1 so that the light-emitting device 4 is electrically connected with the support terminal 52 through the solder ball 22.

The embodiment of FIG. 14 to FIG. 17 can achieve the same operations and effects as that of the embodiment of FIG. 1 to FIG. 12.

In the embodiment of FIG. 16, the insulating cover layer 9 is formed so as to cover the first conductive portion 53, for example, although not shown, the insulating cover layer 9 can be formed so as to expose the first conductive portion 53.

Figure 22:
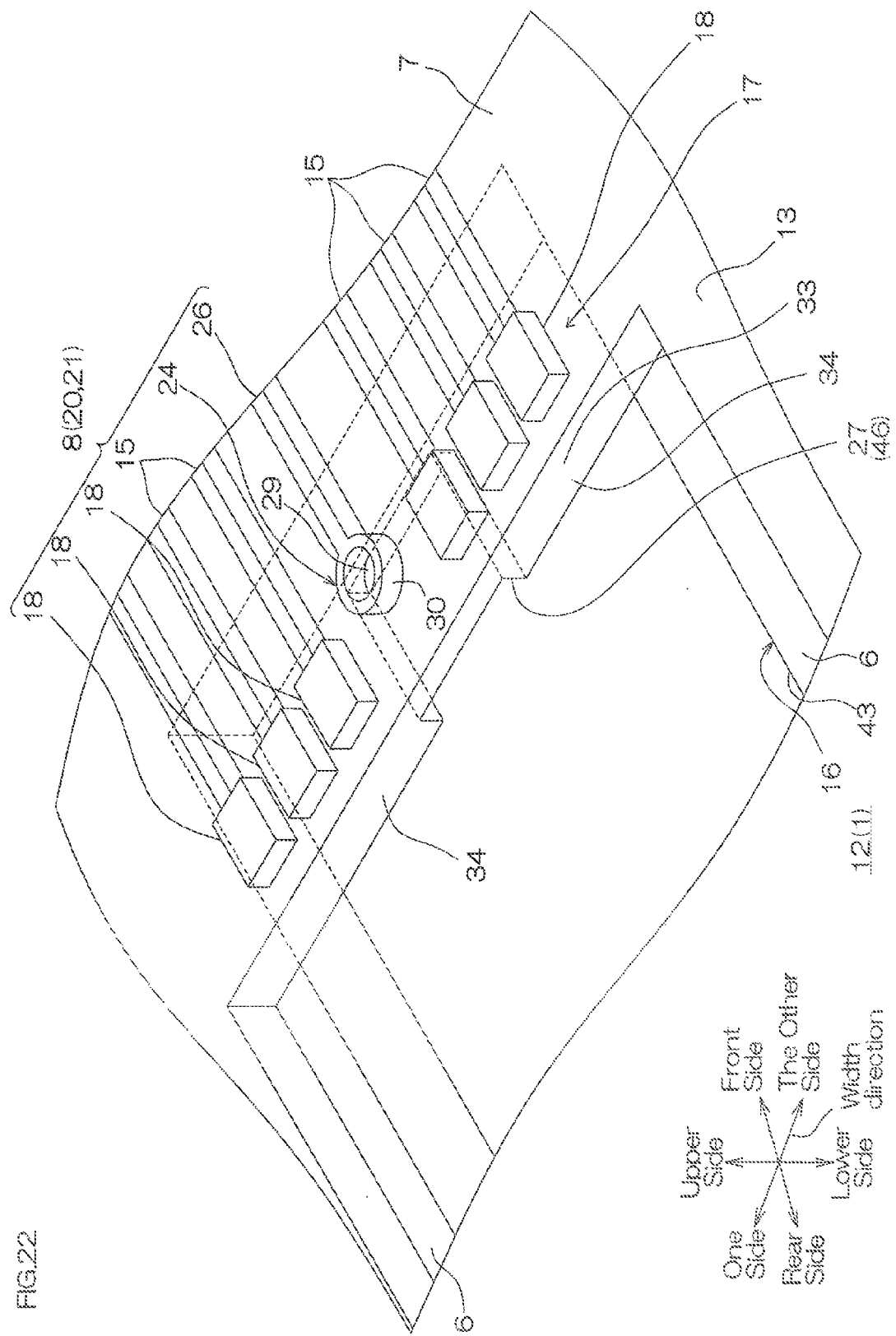
FIG. 22 shows a perspective view from above of a mount section of a suspension board with circuit in another embodiment of the present invention (embodiment in which the upper cutout is not formed) (ref.
Figure 23:
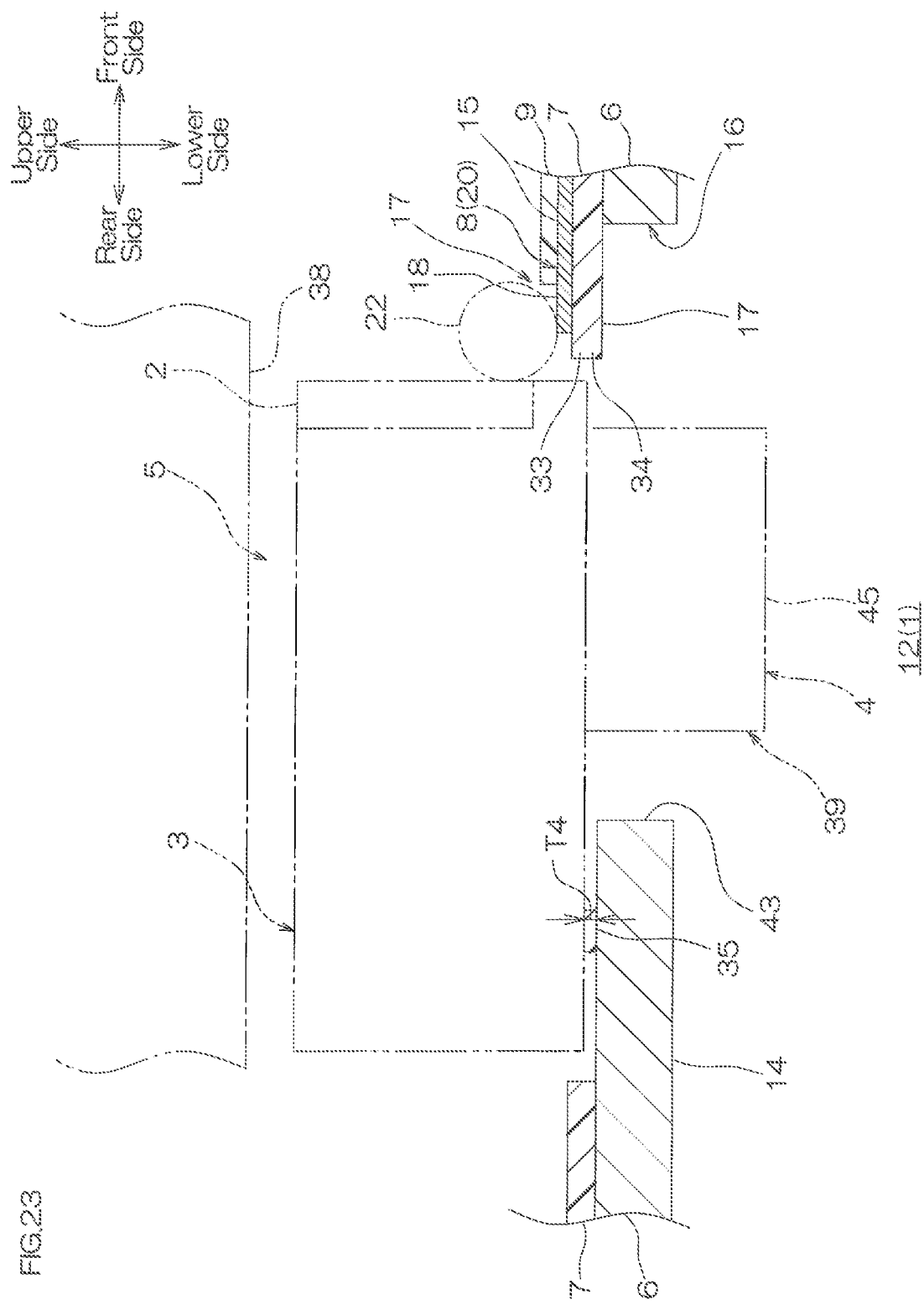
FIG. 23 shows a cross-sectional view of the suspension board with circuit shown in FIG. 22 including the slider unit mounted thereon (ref.

FIG. 18 shows a plan view of a mount section of a suspension board with circuit in another embodiment of the present invention; FIG. 19 shows a bottom view of the mount section shown in FIG. 18; FIG. 20 shows a plan view of a mount section of a suspension board with circuit in another embodiment of the present invention; and FIG. 21 shows a bottom view of a mount section shown in FIG. 20. FIG. 22 shows a perspective view from above of a mount section of a suspension board with circuit in another embodiment of the present invention (embodiment in which the upper cutout is not formed) (ref: FIG. 4). FIG. 23 shows a cross-sectional view with the slider unit mounted on the suspension board with circuit shown in FIG. 22 (ref: FIG. 9).

In the embodiment of FIG. 14 and FIG. 15, one first conductive portion 53 and one support terminal 52 are provided, but the number is not particularly limited, and for example, a plurality of first conductive portions 53 and a plurality of support terminals 52 can be provided. To be specific, as shown in FIGS. 18 and 19, three first conductive portions 53 and three support terminals 52 can be provided.

In FIG. 18, the three first conductive portions 53 are provided at the wire turnaround portion 25. To be specific, the first conductive portions 53 are provided in spaced-apart relation in the width and longitudinal directions.

As shown in FIG. 19, three support terminals 52 are provided in correspondence with the three first conductive portions 53 (ref: FIG. 18), and the three support terminals 52 are provided in spaced-apart relation to each other in the width direction. The front end portions of the three support terminals 52 are facing the three first conductive portions 53 in the thickness direction, respectively, and the rear end faces of the three support terminals 52 are disposed at the same position when projected in the width direction.

The embodiment of FIG. 18 and FIG. 19 can achieve the same operations and effects as that of the embodiment of FIG. 14 to FIG. 16.

Furthermore, as shown in FIGS. 20 and 21, by using the support terminal 52 and the device-side terminal 24 in combination, these can be provided.

In FIG. 20, the first conductive portions 53 and the device-side terminal 24 are arranged in line in spaced-apart relation to each other in front-rear direction and width direction. Two first conductive portions 53 are provided, and are disposed so as to sandwich the device-side terminal 24 in the width direction when projected in the front-rear direction. The two first conductive portions 53 are disposed at the front side of the support terminal 52 in spaced-apart relation when projected in the width direction.

As shown in FIG. 21, two support terminals 52 are provided in correspondence with the two first conductive portions 53, and the two support terminals 52 are disposed in the width direction in spaced-apart relation to each other. Furthermore, the support terminals 52 are disposed so as to sandwich the first conductive portion 53 in the width direction.

The support terminals 52 are provided at the lower portion 34 of the insulating base layer 7. The lower cutout 27 is formed by cutting out the center portion of the lower portion 34 in the width direction along the front-rear direction.

The embodiment of FIG. 20 and FIG. 21 can achieve the same operations and effects as that of the embodiments of FIG. 1 to FIG. 12, and FIG. 18 and FIG. 19.

Although in the embodiment of FIG. 4 and FIG. 9, the insulating base layer 7 is formed with the upper cutout 31, for example, as shown in FIGS. 22 and 23, without forming the upper cutout 31 in the insulating base layer 7, the rear end portion of the insulating base layer 7 in the terminal-forming region 17 can be formed into a generally rectangular shape when viewed in side cross section, facing the support opening 16.

As shown in FIGS. 22 and 23, the rear end face and the upper end face of the insulating base layer 7 in the terminal-forming region 17 are formed to be flat.

In the embodiment of FIG. 22 and FIG. 23, when the insulating base layer 7 is projected in the width direction, the portion overlapping with the lower cutout 27 (not shown in FIG. 23) is regarded as the lower portion 34, and the portion not overlapping with the lower cutout 27 but formed above the lower cutout 27 and the lower portion 34 is regarded as the upper portion 33.

The upper portion 33 covers the lower cutout 27, and at the same time, formed in continuity with the lower portion 34.

The lower portion 34 is formed at both sides in the width direction of the lower cutout 27, so as to sandwich the lower cutout 27 in the width direction.

The upper portion 33 is formed to be flush with the lower portion 34 in the thickness direction.

As shown by the phantom line in FIG. 23, when the slider unit 5 is mounted on the suspension board with circuit 1, the front end portion of the slider 3 is positioned so that a minute interval is provided between the rear end face of the insulating base layer 7 in the terminal-forming region 17 in the front-rear direction.

The embodiment of FIG. 22 and FIG. 23 also can achieve the same operations and effects as that of the embodiment of FIG. 4 and FIG. 9.

Figure 24:
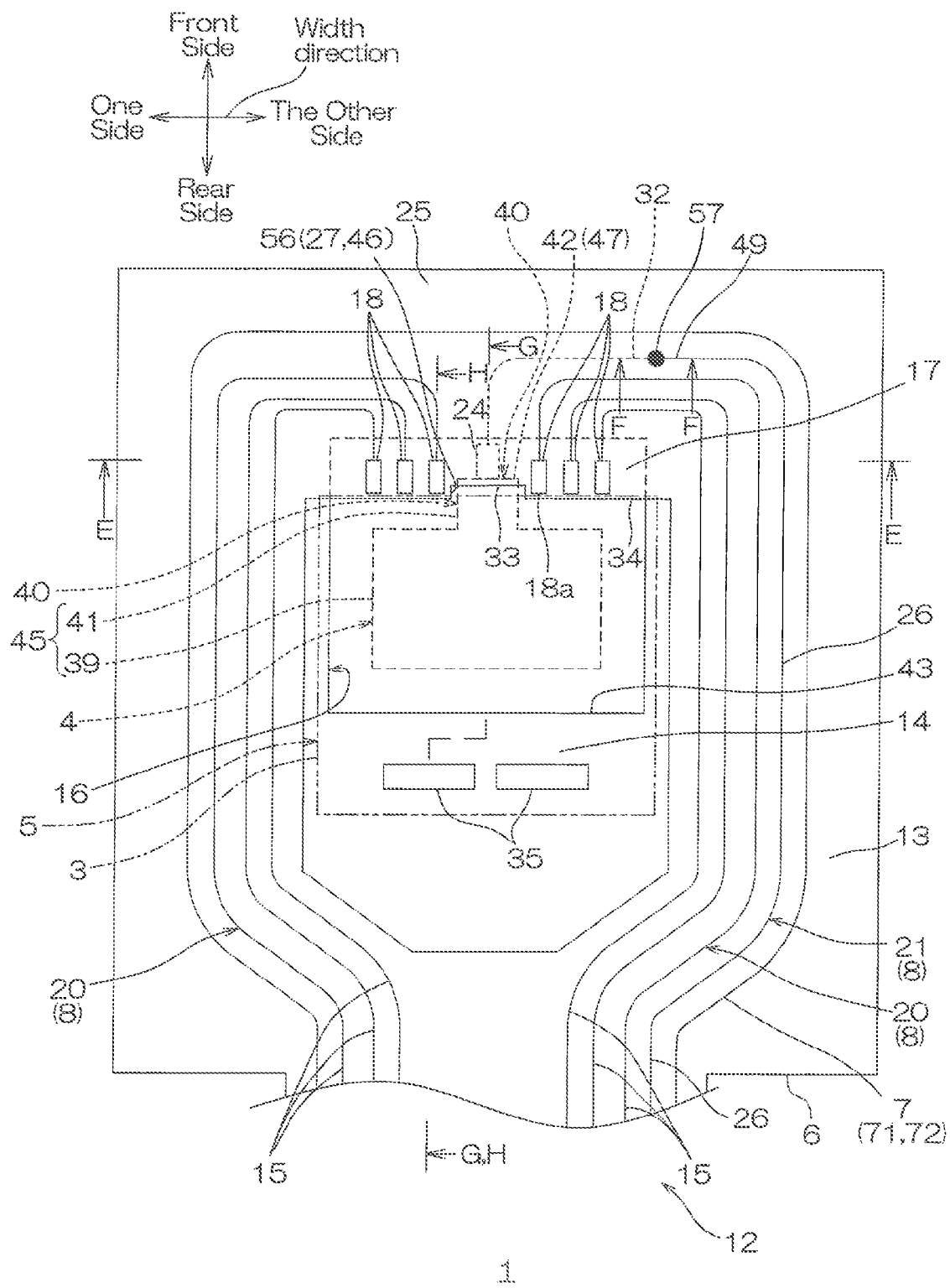
FIG. 24 shows a plan view of a mount section of a suspension board with circuit in another embodiment of the present invention.
Figure 27:
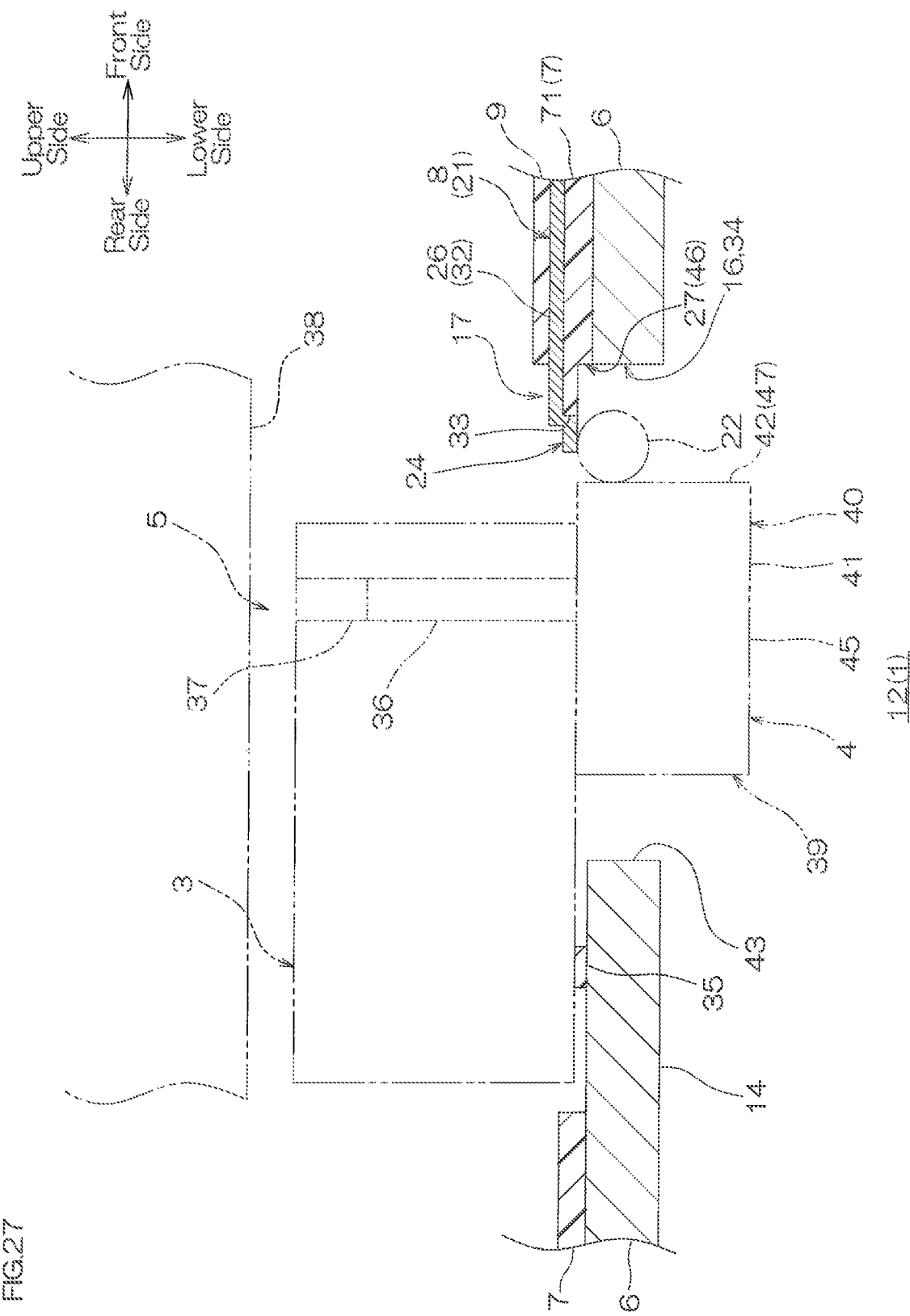
FIG. 27 shows a cross-sectional view taken along line G-G of the suspension board with circuit of FIG. 24.
Figure 28:
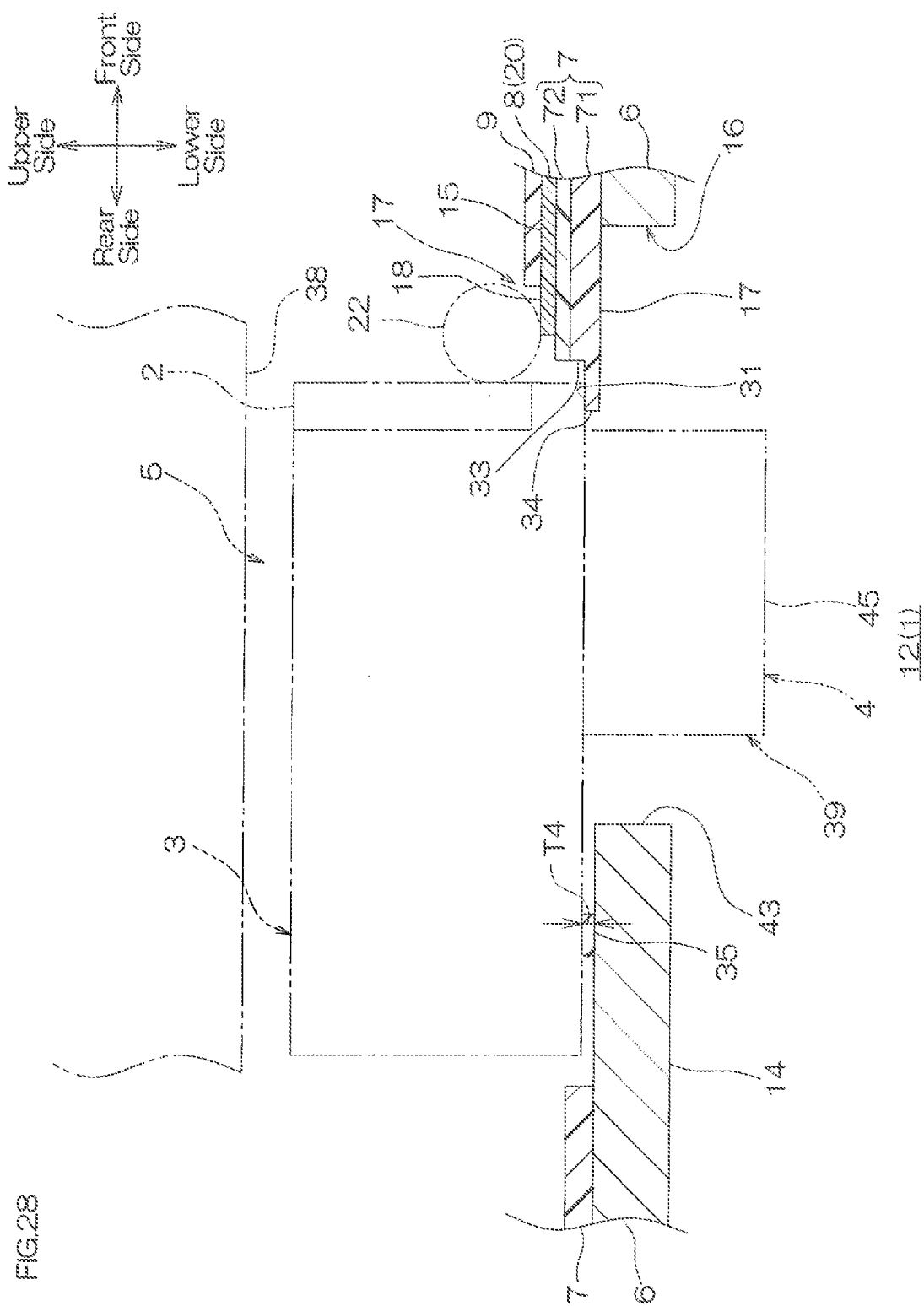
FIG. 28 shows a cross-sectional view taken along line H-H of the suspension board with circuit of FIG. 24.

FIG. 24 shows a plan view of a mount section of a suspension board with circuit in another embodiment of the present invention, FIG. 25 shows a cross-sectional view taken along line E-E of the suspension board with circuit shown in FIG. 24; FIG. 26 shows a cross-sectional view taken along line F-F of the suspension board with circuit shown in FIG. 24; FIG. 27 shows a cross-sectional view taken along line G-G of the suspension board with circuit shown in FIG. 24; and FIG. 28 shows a cross-sectional view taken along line H-H of the suspension board with circuit shown in FIG. 24.

As shown in FIG. 25, the insulating base layer 7 can be formed from two layers of a first insulating base layer 71 and a second insulating base layer 72.

As shown in FIG. 25, the insulating base layer 7 includes a first insulating base layer 71 formed on the metal supporting board 6, and a second insulating base layer 72 formed on the first insulating base layer 71.

As shown in FIG. 27, the first insulating base layer 71 is formed with a lower cutout 27.

As shown in FIG. 26, the second insulating base layer 72 is formed so as to cover the side surface of the lower section 32 (described later) of the power source wire 26. An insulating cover layer 9 is formed above the second insulating base layer 72.

As shown in FIG. 28, a first conductive pattern 20 including head-side terminals 18 and signal wires 15 is formed on the upper surface of the second insulating base layer 72.

As shown in FIG. 26, the power source wire 26 in the second conductive pattern 21 integrally includes an upper section 49 formed on the upper surface of the second insulating base layer 72, and a lower section 32 formed on the upper surface of the first insulating base layer 71.

The lower section 32 is formed so as to be sandwiched between the first insulating base layer 71 and the insulating cover layer 9.

The upper section 49 is formed so as to be sandwiched between the second insulating base layer 72 and the insulating cover layer 9. As shown in FIG. 24 and FIG. 26, the upper section 49 and the lower section 32 are electrically connected in the thickness direction through a second conductive portion 57 disposed between the other side end portion and the center portion in the width direction of the wire turnaround portion 25 and formed into a generally circular shape when viewed from the top.

That is, the lower section 32 is formed so as to extend continuously toward the left side from the second conductive portion 57, and the upper section 49 is formed so as to extend continuously toward the right side from the second conductive portion 57.

As shown in FIG. 27, the device-side terminal 24 is formed so that its front end portion is formed on the upper surface of the first insulating base layer 71, and its rear end portion is exposed from the first insulating base layer 71.

To be specific, the device-side terminal 24 is formed so that, in a cross sectional view, a middle portion in the front-rear direction of the device-side terminal 24 is formed along the rear end face of the first insulating base layer 71, and thereafter, the rear end portion of the device-side terminal 24 is formed so as to protrude toward the rear side from the rear end face of the first insulating base layer 71.

The lower surface of the rear end portion of the device-side terminal 24 is formed to be flush with the upper surface of the lower cutout 27 in the first insulating base layer 71.

The embodiment of FIG. 24 to FIG. 28 also can achieve the same operations and effects as that of the embodiment of FIG. 1 to FIG. 12.

Furthermore, in the embodiment of FIG. 24 to FIG. 28, the device-side terminal 24 (ref: FIG. 27) formed on a different insulating base layers 7 as that of the head-side terminals 18 (ref: FIG. 28). To be specific, as shown in FIG. 27, the device-side terminal 24 (its front end portion) is formed on the first insulating base layer 71, while as shown in FIG. 28, the head-side terminal 18 is formed on the second insulating base layer 72.

Thus, the degree of freedom for designs for the device-side terminal 24 and the head-side terminals 18 is increased, and moreover, the degree of freedom for the positions of the slider 3 on which the magnetic head 2 is mounted, and for the light-emitting device 4 to be connected thereto can be increased.

Figure 29:
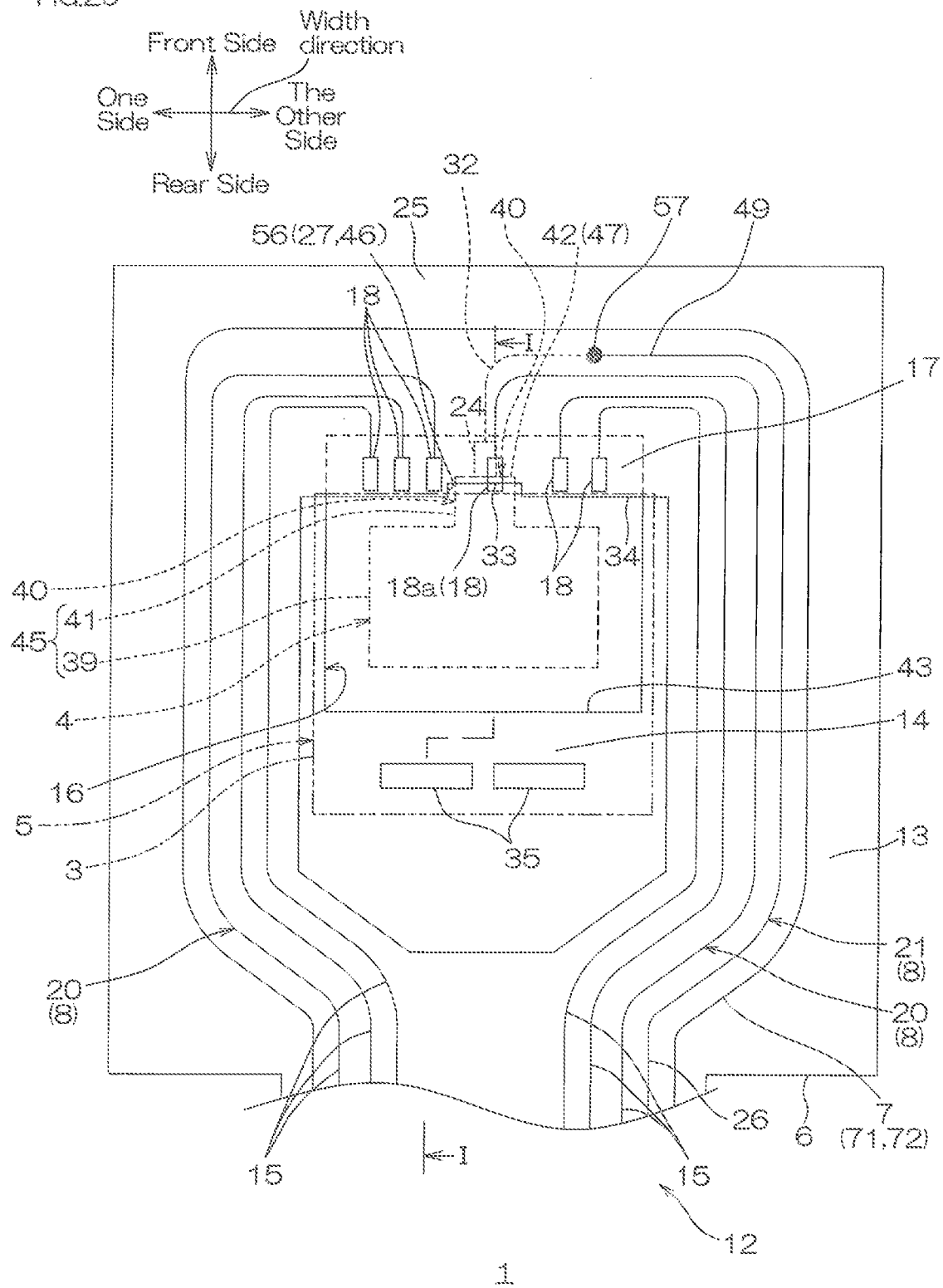
FIG. 29 shows a plan view of a mount section of a suspension board with circuit in another embodiment of the present invention.
Figure 30:
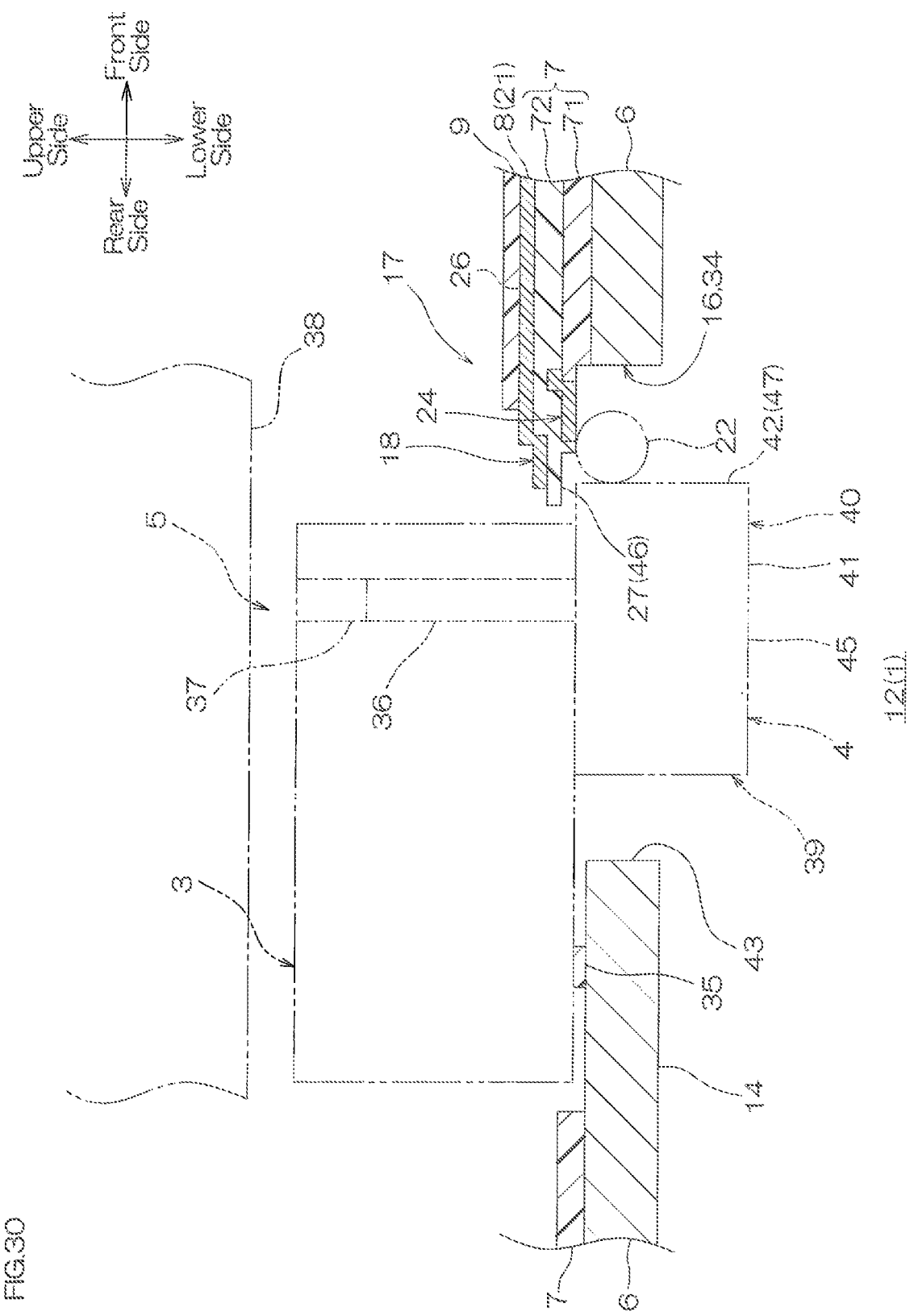
FIG. 30 shows a cross-sectional view taken along line I-I of the suspension board with circuit of FIG. 29.

FIG. 29 shows a plan view of a mount section of a suspension board with circuit in another embodiment of the present invention, and FIG. 30 shows a cross-sectional view taken along line I-I of the suspension board with circuit of FIG. 29.

In the embodiment of FIG. 24 to FIG. 28, as shown in FIG. 24 and FIG. 25, the device-side terminal 24 and the head-side terminals 18 are disposed so that they are not overlapped when projected in the thickness direction, but for example, as shown in FIG. 29, they can be disposed so that they are overlapped with each other.

As shown by the broken line in FIG. 29, the device-side terminal 24 is disposed so that the device-side terminal 24 partially overlaps with the head-side terminals 18a disposed at the most center side in the width direction (left side) in the other side portion (right side portion) in the width direction, when projected in the thickness direction.

To be specific, when projected in the thickness direction, the other end portion (right end portion) in the width direction of the device-side terminal 24 overlaps with one end portion (left end portion) in the width direction of the head-side terminals 18a, and as shown in FIG. 29 and FIG. 30, when projected in the thickness direction, the rear end portion of the device-side terminal 24 overlaps with the front end portion of the head-side terminals 18.

The second insulating base layer 72 is formed with a lower cutout 27.

In the embodiment of FIG. 29 and FIG. 30, the device-side terminal 24 and the head-side terminals 18 are overlapped with each other when projected in the thickness direction, and therefore highly densified device-side terminal 24 and head-side terminals 18 can be achieved, and moreover, highly densified first conductive pattern 20 and second conductive pattern 21 can be achieved.

While the illustrative embodiments of the present invention are provided in the above description, they are for illustrative purposes only and not to be construed as limiting. Modifications and variations of the present invention that will be obvious to those skilled in the art is to be covered by the appended claims.

What is claimed is:

1. A suspension board with circuit for mounting a slider unit including a slider and an electron device,
   the electron device being mounted so as to form, when projected in the thickness direction with respect to the slider provided with a magnetic head,
   an overlapping portion that overlaps with the slider, and
   a protruding portion that protrudes from the slider in a longitudinal direction of the suspension board with circuit, where the longitudinal direction of the suspension board with circuit is defined as a front-rear direction along an elongated length of the suspension board with circuit, with the slider unit being mounted to a mount region located at a front end portion of the suspension board with circuit,
   wherein the suspension board with circuit is formed with a first opening that penetrates in the thickness direction, which is perpendicular to the longitudinal direction of the suspension board with circuit, and accommodates the overlapping portion,
   a second opening that communicates with the first opening, wherein the second opening extends from the first opening in the longitudinal direction of the suspension board with circuit, wherein the second opening is smaller in width than a width of the first opening in a widthwise direction of the suspension board with circuit, where the widthwise direction is perpendicular to both the longitudinal direction and the thickness direction, and
   wherein the second opening accommodates the protruding portion of the electron device,
   wherein the protruding portion has a width smaller than a width of the overlapping portion in the widthwise direction of the suspension board with circuit,
   wherein the suspension board with circuit further comprises a metal supporting board and an insulating base layer formed on the metal supporting board,
   wherein the first opening is defined by a region at a rear side in the front-rear direction of a support opening passing through the metal supporting board in the thickness direction, the region being exposed from the insulating base layer, and
   wherein the second opening is defined by a cutout extending from a front end face of the first opening in the front-rear direction toward a front side in the front-rear direction in the insulating base layer, the cutout being at an inner side in the width direction in a region at the front side in the front-rear direction of the support opening.

2. The suspension board with circuit according to claim 1, further comprising a pedestal interposed between the metal supporting board and the slider.

3. The suspension board with circuit according to claim 2, further comprising
   a conductive pattern on the insulating base layer, the conductive pattern being electrically connected to the magnetic head and the electron device,
   wherein the pedestal has a thickness that is smaller than the thickness of the insulating base layer corresponding to the conductive pattern.

4. The suspension board with circuit according to claim 3, wherein the second opening is formed by cutting out a lower portion of an end portion of the insulating base layer, the end portion facing the first opening.

5. The suspension board with circuit according to claim 4, wherein the slider is formed with a third opening that accommodates the end portion of the insulating base layer.

6. The suspension board with circuit according to claim 1, wherein the electron device is a light-emitting device.

* * * * *